(12) United States Patent
Asano et al.

(10) Patent No.: US 7,759,632 B2
(45) Date of Patent: Jul. 20, 2010

(54) MOTION DETECTION APPARATUS AND ENTERTAINMENT SYSTEM HAVING A PULSE COUNTING UNIT

(75) Inventors: Teppei Asano, Shiga (JP); Shuhei Kato, Shiga (JP)

(73) Assignee: SSD Company Limited, Kusatsu-Shi, Shiga (JP)

( * ) Notice: Subject to any disclaimer, the term of this patent is extended or adjusted under 35 U.S.C. 154(b) by 92 days.

(21) Appl. No.: 11/816,106

(22) PCT Filed: Feb. 15, 2006

(86) PCT No.: PCT/JP2006/303102

§ 371 (c)(1),
(2), (4) Date: Aug. 13, 2007

(87) PCT Pub. No.: WO2006/088220

PCT Pub. Date: Aug. 24, 2006

(65) Prior Publication Data

US 2009/0050793 A1    Feb. 26, 2009

(30) Foreign Application Priority Data

Feb. 17, 2005    (JP)  ............................... 2005-040393

(51) Int. Cl.
*H01J 40/14*    (2006.01)
(52) U.S. Cl. ..................... 250/221; 250/214.1
(58) Field of Classification Search ................. 250/221, 250/214 R, 214.1, 222.1; 340/568.6, 568.1, 340/555–557; 377/12
See application file for complete search history.

(56) References Cited

U.S. PATENT DOCUMENTS 5,684,830 A    11/1997   Ichikawa et al.
7,064,670 B2 *   6/2006   Galperin et al. .......... 340/573.4

FOREIGN PATENT DOCUMENTS

| EP | 667682 A | 8/1995 |
| JP | 57-106866 A | 7/1982 |
| JP | 7-273814 A | 10/1995 |

OTHER PUBLICATIONS

International Search Report, May 26, 2006, from International Phase of the instant application.

* cited by examiner

*Primary Examiner*—Que T Le
(74) *Attorney, Agent, or Firm*—Jackson Patent Law Office

(57) ABSTRACT

There are provided an infrared light emitting diode 42 operable to emit light in a predetermined cycle; a phototransistor 44 operable to receive light which is emitted by the infrared light emitting diode 42 and reflected from a retroreflective sheet 40 of the operation article 3, and output a light reception signal "Sp"; and a highpass filter unit 116 operable to pass a high frequency component of the light reception signal "Sp", output the high frequency component as a light reception signal "Ss" and operable to generate a reference voltage. The highpass filter unit 116 supplies the reference voltage to a node to which the light reception signal "Ss" is output, and the processor 110 counts the number of pulses included in the light reception signal "Ss", and calculates the speed of the operation article 3.

12 Claims, 21 Drawing Sheets

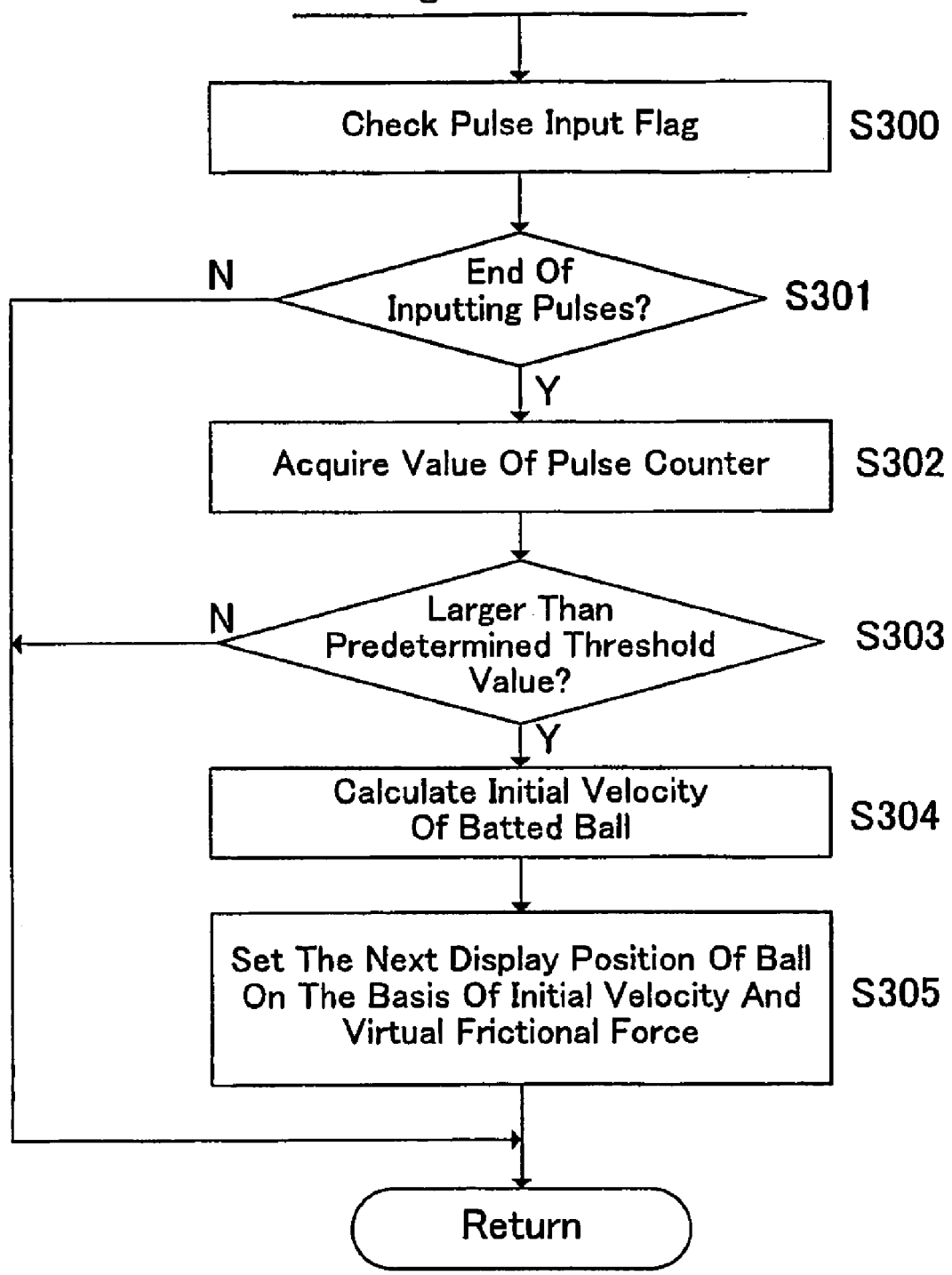

MOTION DETECTION APPARATUS AND ENTERTAINMENT SYSTEM HAVING A PULSE COUNTING UNIT

TECHNICAL FIELD

The present invention relates to a motion detection apparatus, an entertainment system and the related arts in which the motion of an operation article is detected by illuminating the operation article with light and detecting the reflected light therefrom.

BACKGROUND ART

The Japanese Patent Published Application No. 2004-85524 by the present applicant discloses a golf game system including a game apparatus and golf-club-type input device (operation article), and the housing of the game apparatus houses an imaging unit which comprises an image sensor, infrared light emitting diodes and so forth. The infrared light emitting diodes intermittently emit infrared light to a predetermined area above the imaging unit while the image sensor intermittently captures images of the reflecting object of the golf-club-type input device which is moving in the predetermined area.

The motion of the golf-club-type input device can be detected by processing the stroboscopic images of the reflecting object.

However, the scope of costs as required differs from business to business, and thereby it is sometimes required to develop and manufacture a product at a lower cost.

DISCLOSURE OF INVENTION

It is therefore an object of the present invention to provide a motion detection apparatus, an entertainment system and the related arts wherein the cost can be reduced by detecting the motion of an operation article without the use of an imaging device.

In accordance with another aspect of the present invention, a motion detection apparatus operable to detect a motion of an operation article which is held and given motion by an operator, comprises: a light emitting unit operable to emit light in a predetermined cycle; a light receiving unit operable to receive light which is emitted by said light emitting unit and reflected from the operation article, and output a first light reception signal; and a counting unit operable to receive the first light reception signal and count the number of pulses included in the first light reception signal.

In accordance with this configuration, the number of pulses included in the first light reception signal varies depending upon the speed of the operation article as a target of detection. Accordingly, it is possible to detect the speed of the operation article only by counting the number of pulses included in the first light reception signal. As thus described, even if an imaging device is not provided, the motion of the operation article can be detected by a simple structure so that the cost can be reduced.

The above motion detection apparatus may further comprises: a light emitting range regulation unit operable to regulate the light emitting range of the light emitted by said light emitting unit; and a light receiving range regulation unit operable to regulate the light receiving range of said light receiving unit.

In accordance with this configuration, since the light emitting range and the light receiving range can be arbitrarily set, the speed of the operation article can be appropriately detected by narrowing the detection range which is regulated by the light emitting range and the light receiving range, irrespective of the height of the operation article passing over the light emitting unit and the light receiving unit.

The above motion detection apparatus may further comprises: a highpass filter operable to pass a high frequency component of the first light reception signal and output the high frequency component as a second light reception signal; and a reference voltage generation unit operable to generate a reference voltage, wherein said reference voltage generation unit supplies the reference voltage to a node to which the second light reception signal is output, and wherein said counting unit counts the number of pulses included in the second light reception signal.

In accordance with this configuration, since the pulses appear on the reference voltage, it is possible to stably count the number of pulses while avoiding the influence of an environmental light source as little as possible. In other words, it is possible to stably detect the speed of the operation article irrespective of the type of the environmental light source.

In accordance with this motion detection apparatus, said reference voltage generation unit is formed by connecting a first resistor element and a second resistor element in series between a first line for supplying a first voltage and a second line for supplying a second voltage, wherein said highpass filter is formed of a capacitor and the second resistor element, and wherein the connection point between the first resistor element and the second resistor element is the node to which the second light reception signal is output.

In accordance with this configuration, since the number of components of which the highpass filter and the reference voltage generation unit are made up can be limited as few as possible, it is possible to further reduce the cost.

In accordance with the above motion detection apparatus, said reference voltage generation unit is formed by connecting a first resistor element and a second resistor element in series between a first line for supplying a first voltage and a second line for supplying a second voltage, wherein said highpass filter is formed of a capacitor and the second resistor element, and wherein the connection point between the first resistor element and the second resistor element is the node to which the second light reception signal is output.

In accordance with this configuration, the circuit configuration can be further simplified, and thereby it is possible to further reduce the cost.

In accordance with another aspect of the present invention, an entertainment system comprising: a light emitting unit operable to emit light to illuminate a light emitting range; a light receiving unit operable to receive the light of said light emitting unit reflected in a light receiving range from a reflection surface which is moved by a player of the entertainment system, and output a light reception signal; and a signal processing unit connected to said light receiving unit, and operable to receive the light reception signal, process the light reception signal, obtain information about the motion of the reflection surface by the player, and generate a video signal in accordance with the information, wherein a detection area is defined as an area where the light emitting range and the light receiving range overlap each other, wherein said signal processing unit calculates the duration for which the reflection surface is in the detection area on the basis of the light reception signal output from said light receiving unit, and calculates the speed of the reflection surface which is moved by the player on the basis of the duration.

In accordance with this configuration, it is possible to provide an entertainment system at a low cost in which the motion speed of the player can be detected.

BRIEF DESCRIPTION OF DRAWINGS

The novel features of the invention are set forth in the appended claims. The invention itself, however, as well as other features and advantages thereof, will be best understood by reading the detailed description of specific embodiments in conjunction with the accompanying drawings, wherein:

FIG. 24 is a flow chart for showing an example of the swing determination process in step S106 of FIG. 22.

BEST MODE FOR CARRYING OUT THE INVENTION

In what follows, an embodiment of the present invention will be explained in conjunction with the accompanying drawings. Meanwhile, like references indicate the same or functionally similar elements throughout the respective drawings, and therefore redundant explanation is not repeated.

Figure 1:
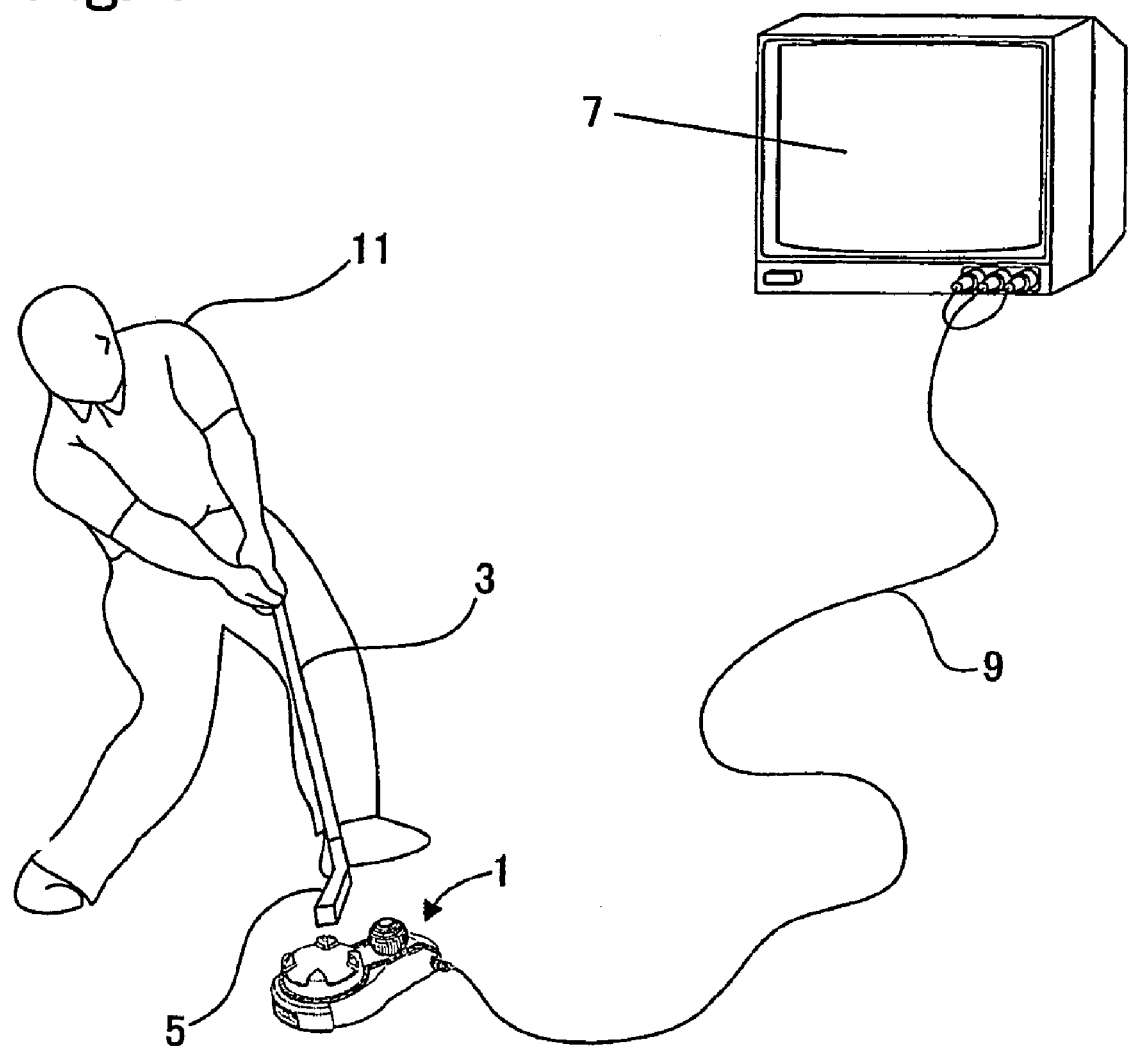
FIG. 1 is a block diagram showings the entire configuration of a game system in accordance with an embodiment of the present invention.

FIG. 1 is a block diagram showings the entire configuration of a game system in accordance with an embodiment of the present invention. As shown in FIG. 1, this game system includes a game apparatus 1, an operation article 3, and a television monitor 7.

In the example of the present embodiment, a golf game is played with the game apparatus 1 such that a player 11 swings the operation article 3 shaped in the form of a golf club for playing the golf game. Accordingly, the operation article 3 is referred to as the "golf club 3".

The game apparatus 1 is connected to the television monitor 7 by an AV cable 9. Furthermore, although not shown in the figure, the game apparatus 1 is supplied with a power supply voltage from an AC adapter or a battery.

This game apparatus 1 detects the speed of the golf club 3 which is swung, and calculates the moving speed of a ball object 65 (refer to FIG. 9 described below) as displayed on the television monitor 7.

Figure 2:
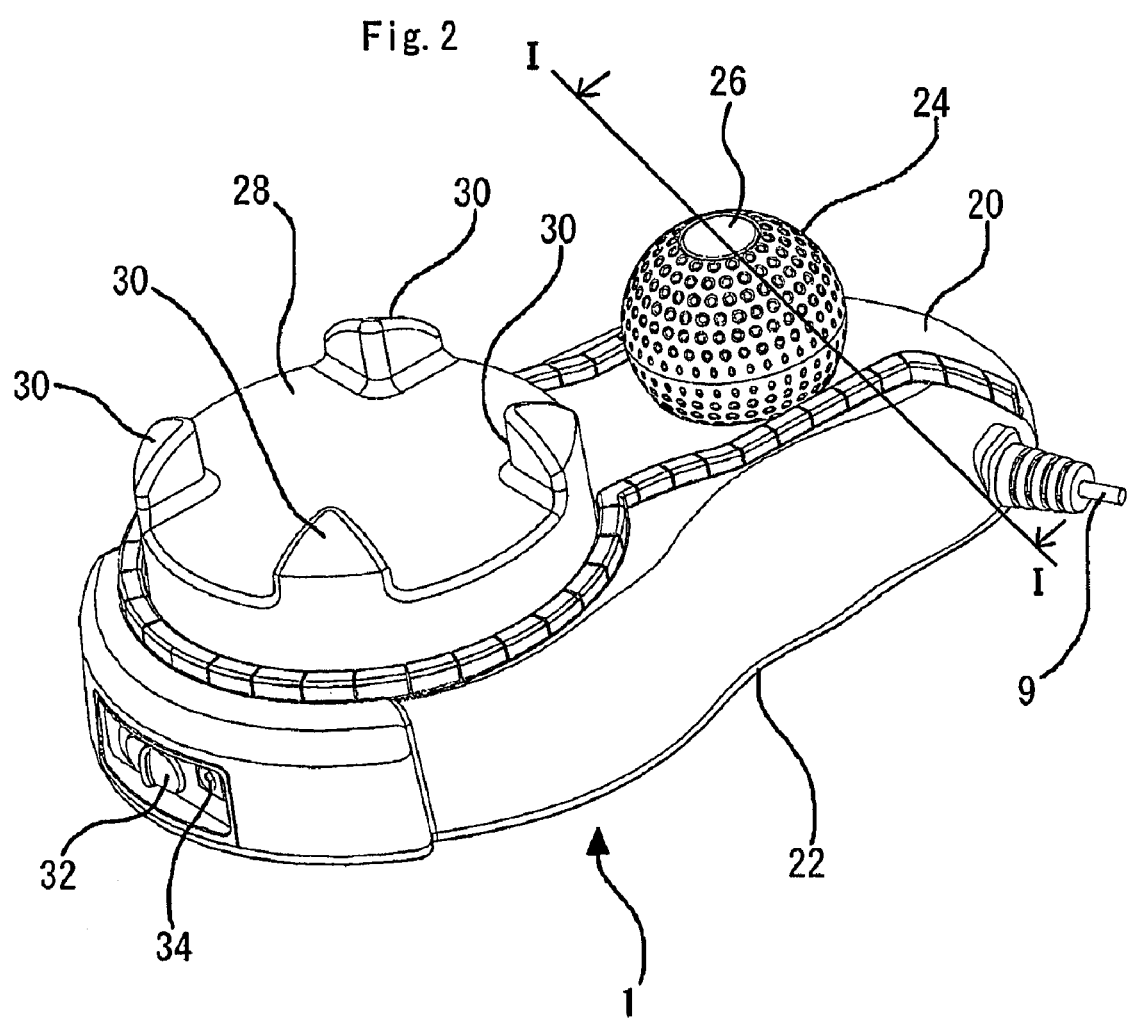
FIG. 2 is a perspective view for showing the game apparatus 1 of FIG. 1.

FIG. 2 is a perspective view for showing the game apparatus 1 of FIG. 1. As shown in FIG. 2, the game apparatus 1 includes an upper housing 20 and a lower housing 22. A rotatable member 28 and a spherical body 24 shaped in the form of a golf ball are placed on the upper surface of the upper housing 20 in the longitudinal direction thereof. The rotatable member 28 is formed in a columnar shape with four claw portions 30 which are shaped in the form of triangle poles which are arranged at even intervals along the periphery on the end face of the rotatable member 28. The side surfaces of the claw portions 30 adjacent to each other are parallel to each other and spaced at a predetermined distance. Accordingly, the end face of the rotatable member 28 provides a cross-shaped surface in a plan view.

As described below, when the player 11 inserts the head 5 of the golf club 3 into the cross-shaped portion (refer to FIG. 14 described below) and rotates the golf club 3, the side surfaces of the head 5 come in contact with the side surfaces of the claw portions 30 whereby the rotatable member 28 is rotated. In addition to this, when the player 11 inserts the head 5 of the golf club 3 into the cross-shaped portion (refer to FIG. 14 described below), the rubber switch 88 to be described below is turned on by pushing down the head 5 and turned off by releasing the head 5.

A circular infrared filter 26 is exposed through the top of the spherical body 24 and serves to transmit only infrared light. As described below, an optical sensor for detecting the golf club 3 is located inside of this spherical body 24. Incidentally, a power supply switch 32 and a DC Jack 34 are provided in the rear side surface of the game apparatus 1.

The game apparatus 1 detects the speed of the golf club 3, swung by the player 11, by the optical sensor. Accordingly, the player 11 can adjust the moving distance and speed of the ball by adjusting the swinging speed of the golf club 3.

Also, the game apparatus 1 makes a ball direction setting object rotate in accordance with the rotation direction and rotation amount of the rotatable member 28. Accordingly, the player 11 can set the ball moving direction by rotating the rotatable member 28.

Figure 3:
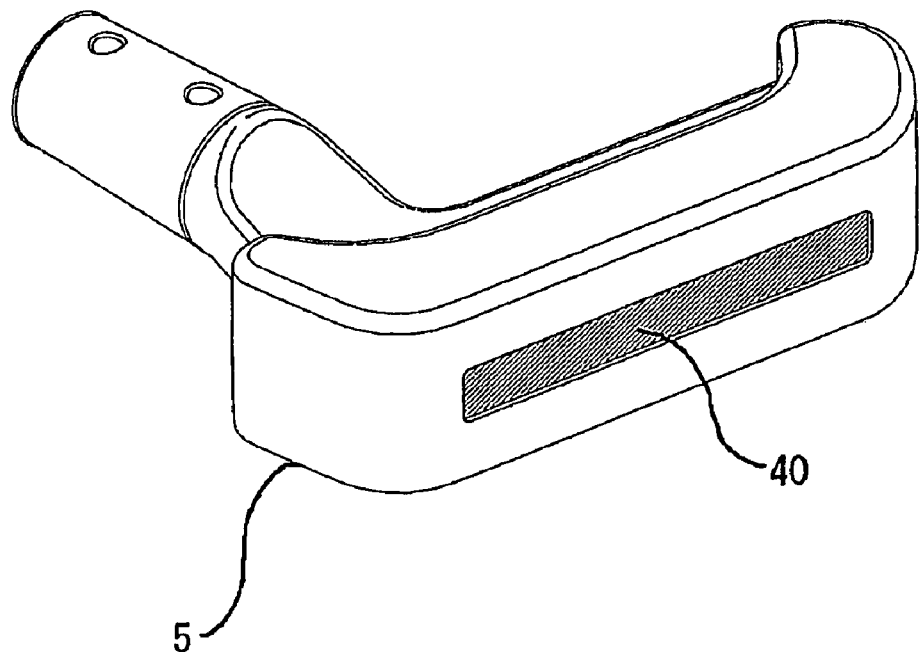
FIG. 3 is an explanatory schematic diagram for showing the bottom surface of the head 5 of the golf club 3 of FIG. 1.

FIG. 3 is an explanatory schematic diagram for showing the bottom surface of the head 5 of the golf club 3 of FIG. 1. As shown in FIG. 3, the bottom surface of the head 5 is provided with a rectangular indent section having a flat bottom surface, and a rectangular retroreflective sheet 40 (shaded portion) is attached to this indent section. Since the retroreflective sheet 40 is attached to the indent section as described above, the breakage of the retroreflective sheet 40 can be prevented even if the head 5 collides with the surface of the rotatable member 28 of FIG. 2.

Figure 4:
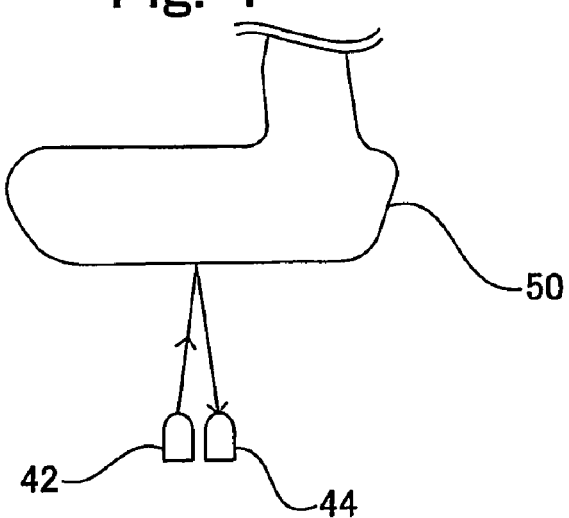
FIG. 4 is an explanatory views for showing the method of detecting the speed of the golf club 3 of FIG. 1.
Figure 5:
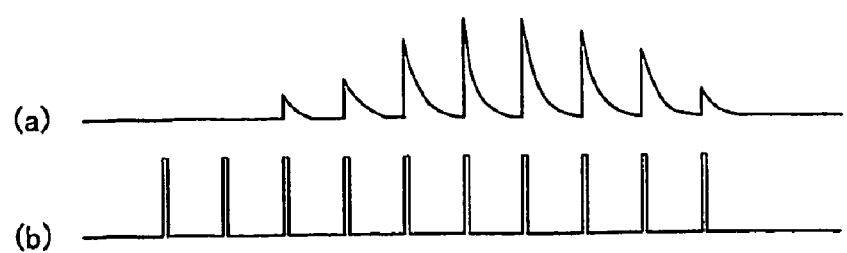
FIG. 5 is an explanatory views for showing the method of detecting the speed of the golf club 3 of FIG. 1.

FIG. 4 and FIG. 5 are explanatory views for showing the method of detecting the speed of the golf club 3 of FIG. 1. As shown in FIG. 4, the infrared light as emitted from an infrared light emitting diode 42 located inside of the spherical body 24 of FIG. 2 is directed to the retroreflective sheet 40 of the head 5 through the infrared filter 26, and then reflected to enter the phototransistor 44 through the infrared filter 26.

This phototransistor 44 is driven by a pulse signal as shown in (b) of FIG. 5, and turned on when the pulse signal is in a high level and turned off when the pulse signal is in a low level. In other words, the infrared light emitting diode 42 is turned on and off repeatedly in a predetermined cycle. Accordingly, the phototransistor 44 intermittently receives light reflected from the retroreflective sheet 40 of the head 5. Because of this, as illustrated in (a) of FIG. 5, the phototransistor 44 outputs a detection signal (light reception signal) which includes pulses corresponding to the reflected light as received. While the number of the pulses varies depending upon the speed of the head 5 as swung, the number of pulses decreases as the speed of the head 5 increases, and the number of pulses increases as the speed of the head 5 decreases. Accordingly, it is possible to detect the speed of the head 5 as swung by counting the number of pulses included in the detection signal.

Figure 6:
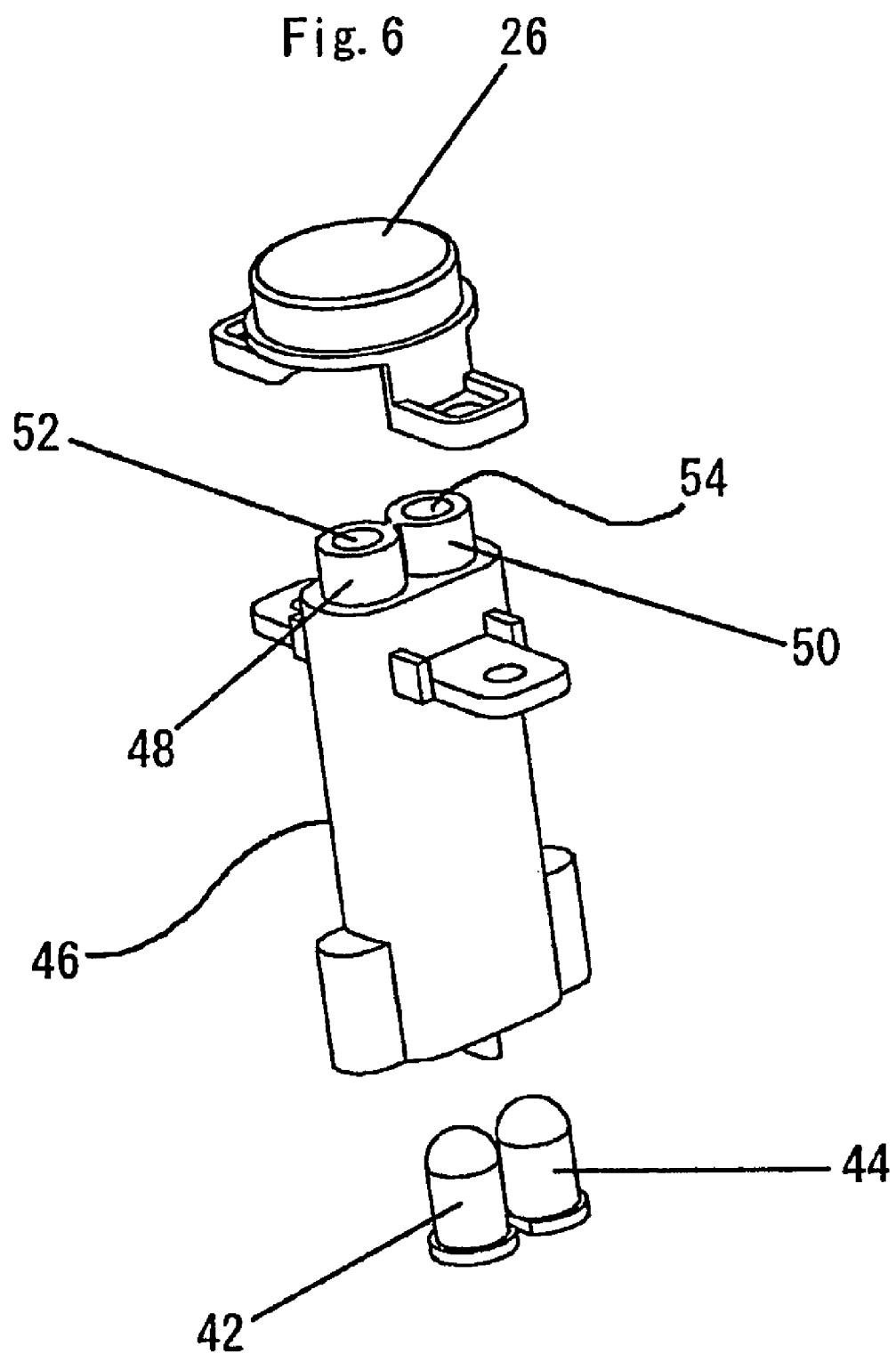
FIG. 6 is a perspective view for showing an optical sensor unit installed in the game apparatus 1 of FIG. 2.
Figure 7:
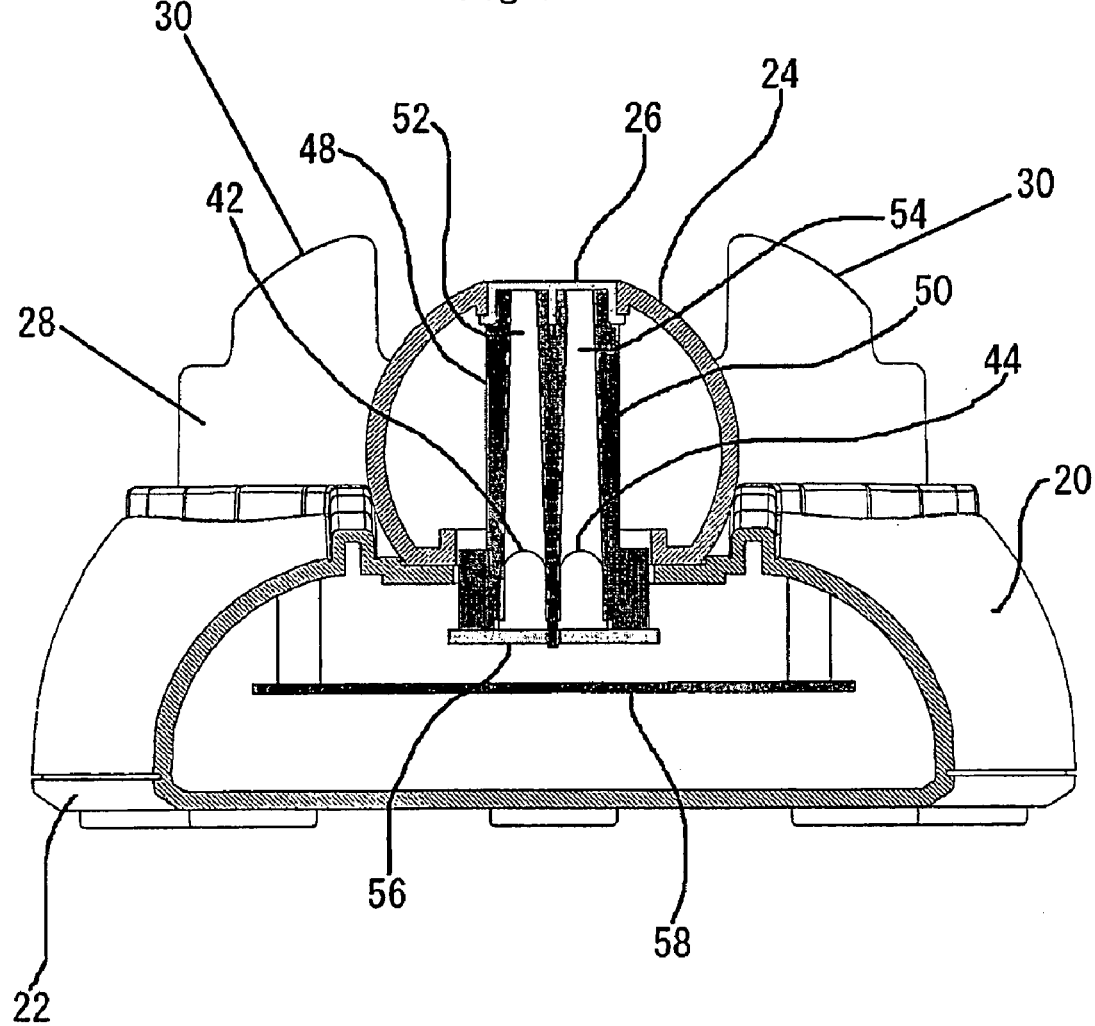
FIG. 7 is a cross sectional view along I-I line of FIG. 2.

FIG. 6 is a perspective view for showing an optical sensor unit installed in the game apparatus 1 of FIG. 2. FIG. 7 is a cross sectional view along I-I line of FIG. 2. As shown in FIG. 6, the optical sensor unit includes the infrared filter 26, a detection range setting unit 46, the infrared light emitting diode 42, and the phototransistor 44. The optical sensor is made up of the infrared light emitting diode 42 and the phototransistor 44. The detection range setting unit 46 includes two cylindrical sections 48 and 50.

Also as illustrated in FIG. 7, optical paths 52 and 54 are formed respectively through the cylindrical sections 48 and 50. The optical paths 52 and 54 are tapered respectively in a cross sectional view.

The infrared filter 26 is attached to the detection range setting unit 46 so that the ends of the cylindrical sections 48 and 50 are located in contact with or close to the rear surface of the infrared filter 26. Also, the infrared light emitting diode 42 is inserted into the optical path 52 at the base end of the cylindrical section 48, and the phototransistor 44 is inserted into the optical path 54 at the base end of the cylindrical section 50.

Also, the infrared light emitting diode 42 and the phototransistor 44 are attached respectively to a substrate 56, from which wires (not shown in the figure) are connected to a substrate 58. The substrate 58 is fixed to the upper housing 20, the substrate 56 is fixed to the detection range setting unit 46, and the detection range setting unit 46 is fixed to the upper housing 20.

Figure 8A:
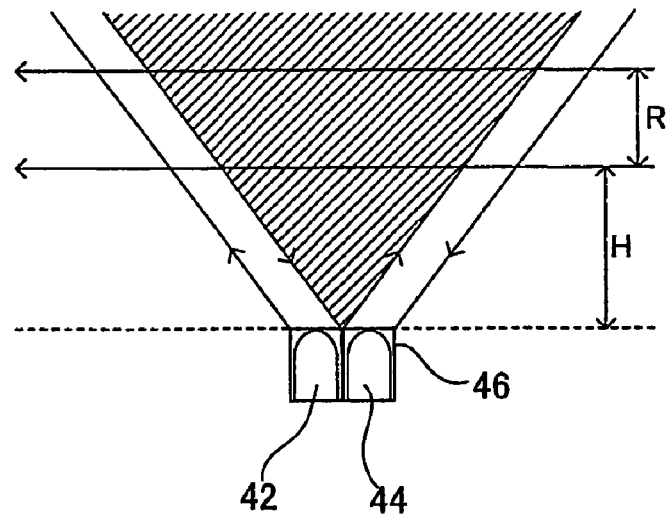
FIG. 8A and FIG. 8B are explanatory views for showing the detection range of an optical sensor which is installed in the game apparatus 1 of FIG. 2.
Figure 8B:
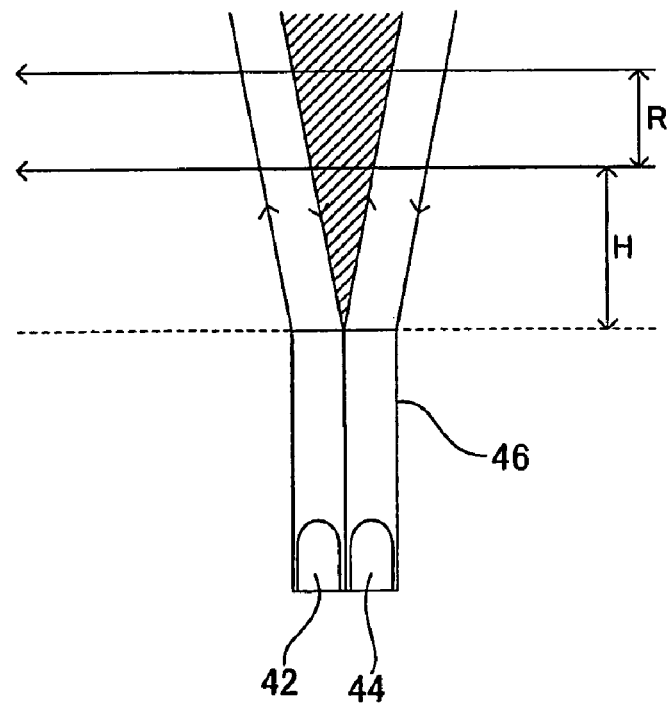

FIG. 8A and FIG. 8B are explanatory views for showing the detection range of the above optical sensor.

As shown in FIG. 8A and FIG. 8B, the detection range of this optical sensor is the range (hatched range) where the light emitting range of the infrared light emitting diode 42 and the light receiving range of the phototransistor 44 overlap each other. Also, the level at a height "H" from the head of the detection range setting unit 46 is regarded as the lowest level through which the head 5 of the golf club 3 passes, and a vertical range from the lowest level to an additional height "R" is regarded as the range within which the head 5 passes. As illustrated in FIG. 8A, in the case where the detection range setting unit 46 is short in height, there is a large difference in the detection range in the horizontal direction between the case where the head 5 passes through the level at the height "H" and the case where the head 5 passes through the level at the height (H+R). Because of this, even if the speed of the head 5 is equal therebetween, a substantial difference can occur between the number of pulses (refer to (a) of FIG. 5) included in the detection signal when the head 5 passes through the level at the height "H" and the number of pulses (refer to (a) of FIG. 5) included in the detection signal when the head 5 passes through the level at the height (H+R). This is undesirable because the speed of the head 5 is calculated on the basis of the number of pulses included in the detection signal as described above.

Thus, by increasing the height of the detection range setting unit 46 as shown in FIG. 8B, the difference of the detection range in the horizontal direction is reduced between the case where the head 5 passes through the level at the height "H" and the case where the head 5 passes through the level at the height (H+R). By this configuration, even if there is a difference in the height at which the head 5 passes, the same or approximately same number of pulses can be obtained as long as the speed is the same. Accordingly, it is possible to calculate an accurate speed irrespective of whether high or low the level in which the head 5 passes is.

The height of the detection range setting unit 46 can be determined in accordance with the height "H" and the height "H+R" and the specifications (the light emitting range and/or the intensity of light emission) of the infrared light emitting diode 42.

In this description, the cylindrical section 48 of the detection range setting unit 46 can be used to regulate the light emitting range of the infrared light emitting diode 42 by adjusting the length thereof, and thereby it can be called as a light emitting range regulation section. On the other hand, the cylindrical section 50 of the detection range setting unit 46 can be used to regulate the light receiving range of the phototransistor 44 by adjusting the length thereof, and thereby it can be called also as a light receiving range regulation section.

Figure 9:
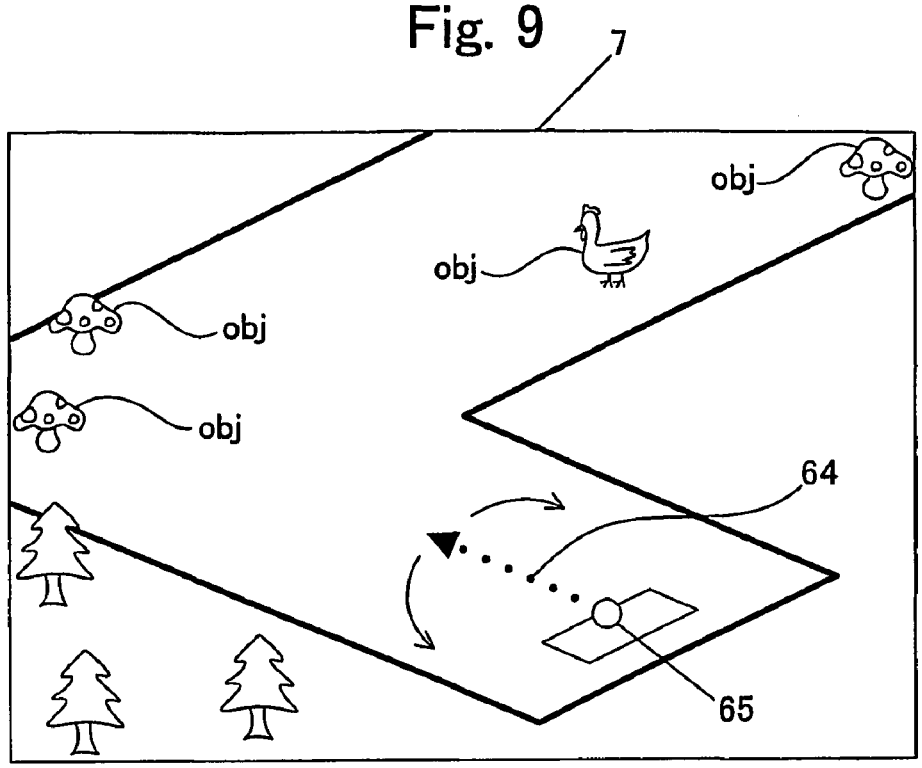
FIG. 9 is a view showing an example of a game screen as displayed on the television monitor 7 of FIG. 1.
Figure 10:
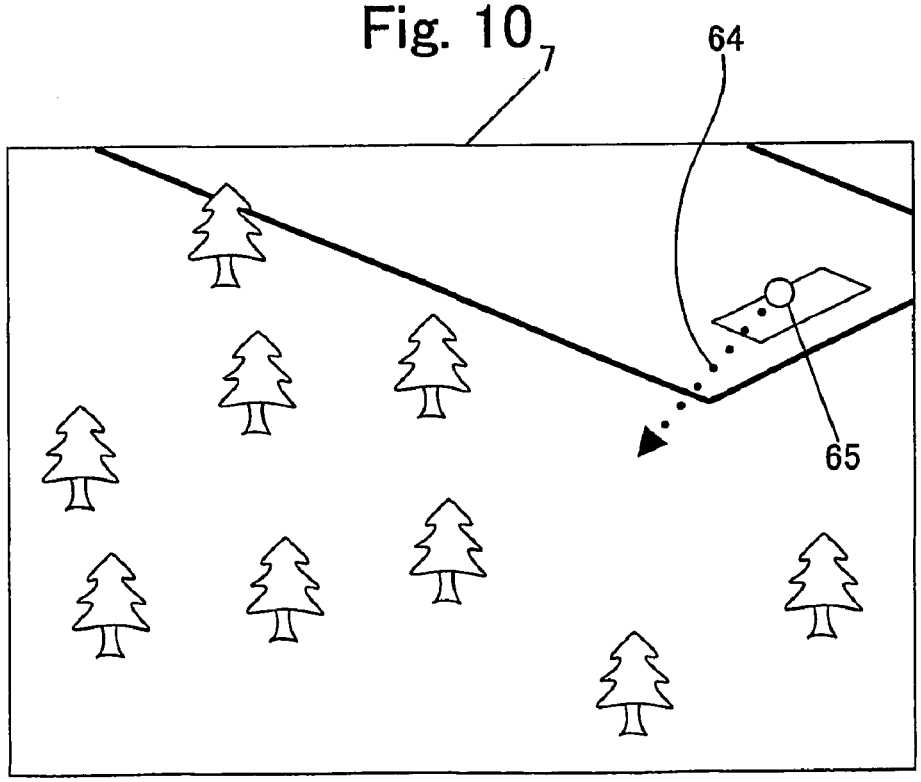
FIG. 10 is a view showing another example of a game screen as displayed on the television monitor 7 of FIG. 1.

FIG. 9 and FIG. 10 are views showing examples of a game screen as displayed on the television monitor 7 of FIG. 1. As shown in FIG. 9, this game screen includes a golf course on which a plurality of objects "obj" is arranged. Furthermore, a ball object 65 and a batted ball direction setting object 64 for setting the moving direction of the ball are displayed at a starting point. The game apparatus 1 detects the speed of the golf club 3 which is swung by the player 11 by the above optical sensor, and makes the ball object 65 move the ball object 65 in the direction indicated by the batted ball direction setting object 64 in accordance with the speed.

Accordingly, the player 11 can adjust the moving distance and speed of the ball object 65 by adjusting the swinging speed of the golf club 3. Also, the game apparatus 1 makes the batted ball direction setting object 64 rotate around the ball object 65 in accordance with the rotation direction and rotation amount of the rotatable member 28 of FIG. 2. Accordingly, the player 11 can set the ball moving direction by rotating the rotatable member 28 in order to rotate the batted ball direction setting object 64. In this case, as shown in FIG. 10, the game apparatus 1 updates the background as displayed in accordance with the direction of the batted ball direction setting object 64. In other words, the background is updated in order that the scene, to which the batted ball direction setting object 64 is oriented, is widely viewed.

The ball object 65 moves from the starting point in accordance with the swing of the golf club 3, and when it stops the batted ball direction setting object 64 is displayed in the position where the ball object 65 stops. Also, if the ball object 65 collides with an object "obj", the moving direction of the ball object 65 is changed in accordance with the direction and the speed.

In this case, the initial direction of the batted ball direction setting object 64 is, at the starting point, the direction (refer to FIG. 9) which is predetermined in accordance with the starting point, otherwise the direction which is predetermined in accordance with the area where the ball object 65 stops. Thereafter, the direction can be arbitrarily changed by rotating the rotatable member 28.

Figure 11:
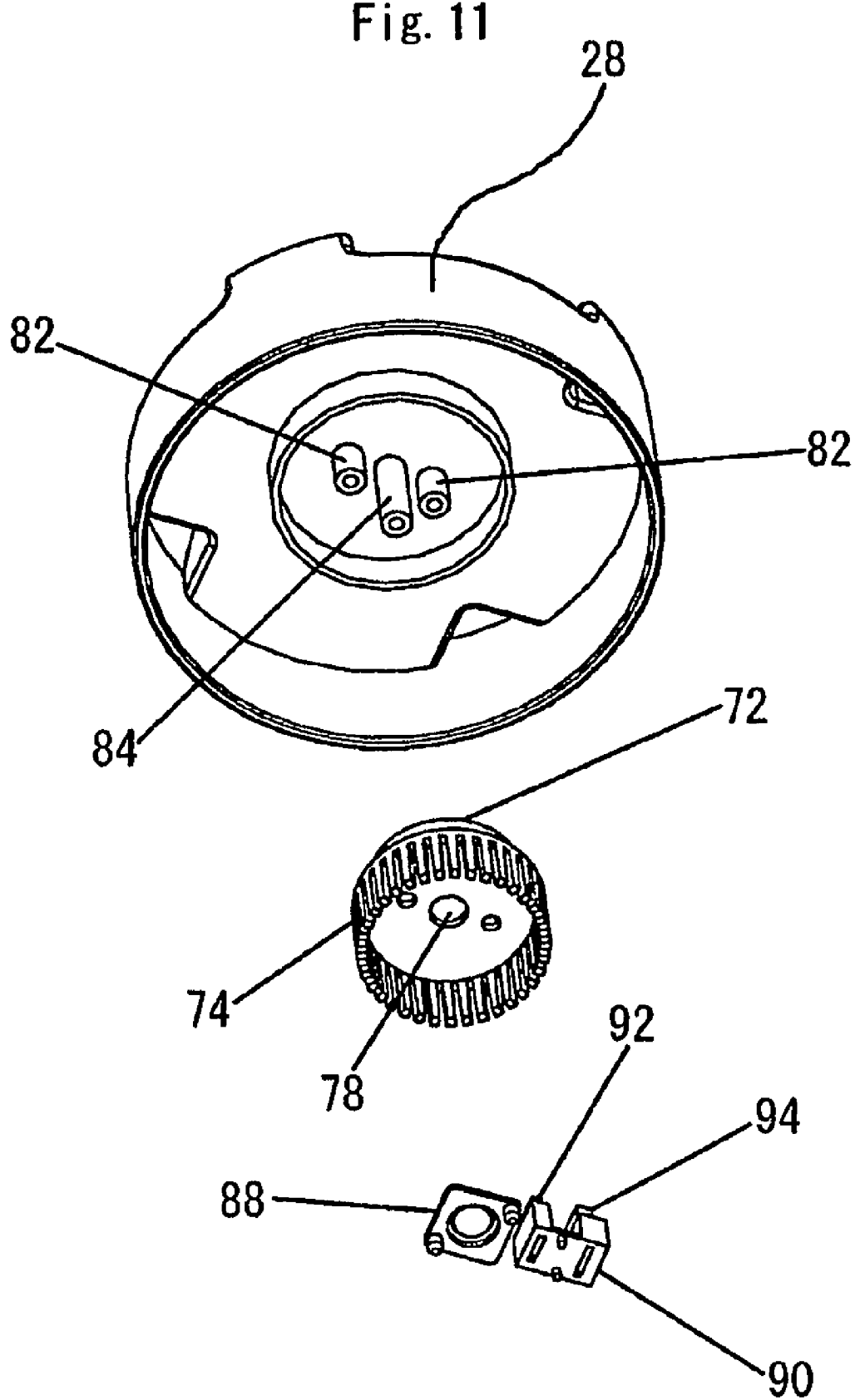
FIG. 11 is an explanatory view for showing a rotation detecting mechanism and a push mechanism of a rotatable member 28 which is installed in the game apparatus 1 of FIG. 2.

FIG. 11 is an explanatory view for showing a rotation detecting mechanism and a push mechanism of the rotatable member 28 which is installed in the game apparatus 1 of FIG. 2. As shown in FIG. 11, a cylindrical member 72 is fixed to the rear surface of the rotatable member 28. Accordingly, when the rotatable member 28 is rotated, the cylindrical member 72 is also rotated integrally with the rotatable member 28. The side wall portion of this cylindrical member 72 is shaped in a comb structure (comb member 74) to alternately form light blocking sections (light shielding sections) and light transmissive sections.

A rotary encoder 118 is made up of the cylindrical member 72 and a photo interrupter 90, and serves to detect the amount of rotation and the rotation direction of the cylindrical member 72, i.e., the amount of rotation and the rotation direction of the rotatable member 28. The photo interrupter 90 is made up of a light emitting diode 92 and a photo transistor unit 94, which is made up of two phototransistors 150 and 152.

Also, a boss 84 protruded from the center of the rear surface of the rotatable member 28 can be passed through an opening 78, which is formed in the center of the cylindrical member 72, in order to come in contact with a rubber switch 88 which is used as an enter button and the like. Accordingly, when the rotatable member 28 is pushed down, the rubber switch 88 is pushed down by the boss 84, turned on by depressing the rotatable member 28 and turned off by releasing the rotatable member 28.

As has been discussed above, the rotatable member 28 functions also as a button for turning on/off the rubber switch 88 in addition to the function of rotating the cylindrical member 72 of the rotary encoder 118. By this configuration, there is no need for creating separate spaces in the surface of the game apparatus 1 respectively for placing the rotatable member 28 and for placing a button which turns on/off the rubber switch 88, so that a small-footprint structure and an aesthetic improvement can be realized. In addition to this, the player 11 can rotate the rotatable member 28 and turn on/off the rubber switch 88 only by a single action of mounting the head 5 of the golf club 3 on the rotatable member 28. The structure as described above will be explained in detail.

Figure 12:
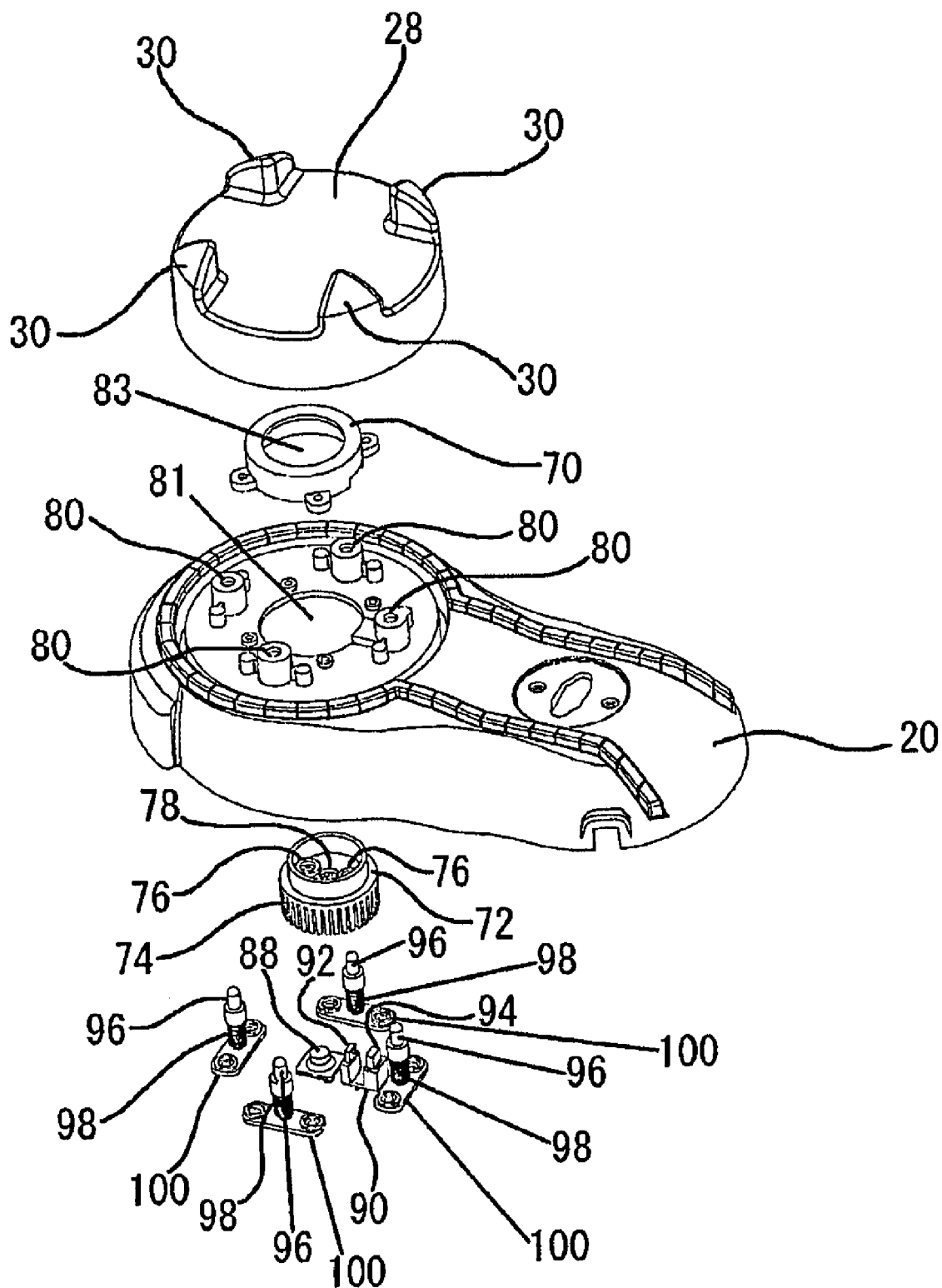
FIG. 12 is an exploded perspective view for showing the game apparatus 1 of FIG. 2.
Figure 13:
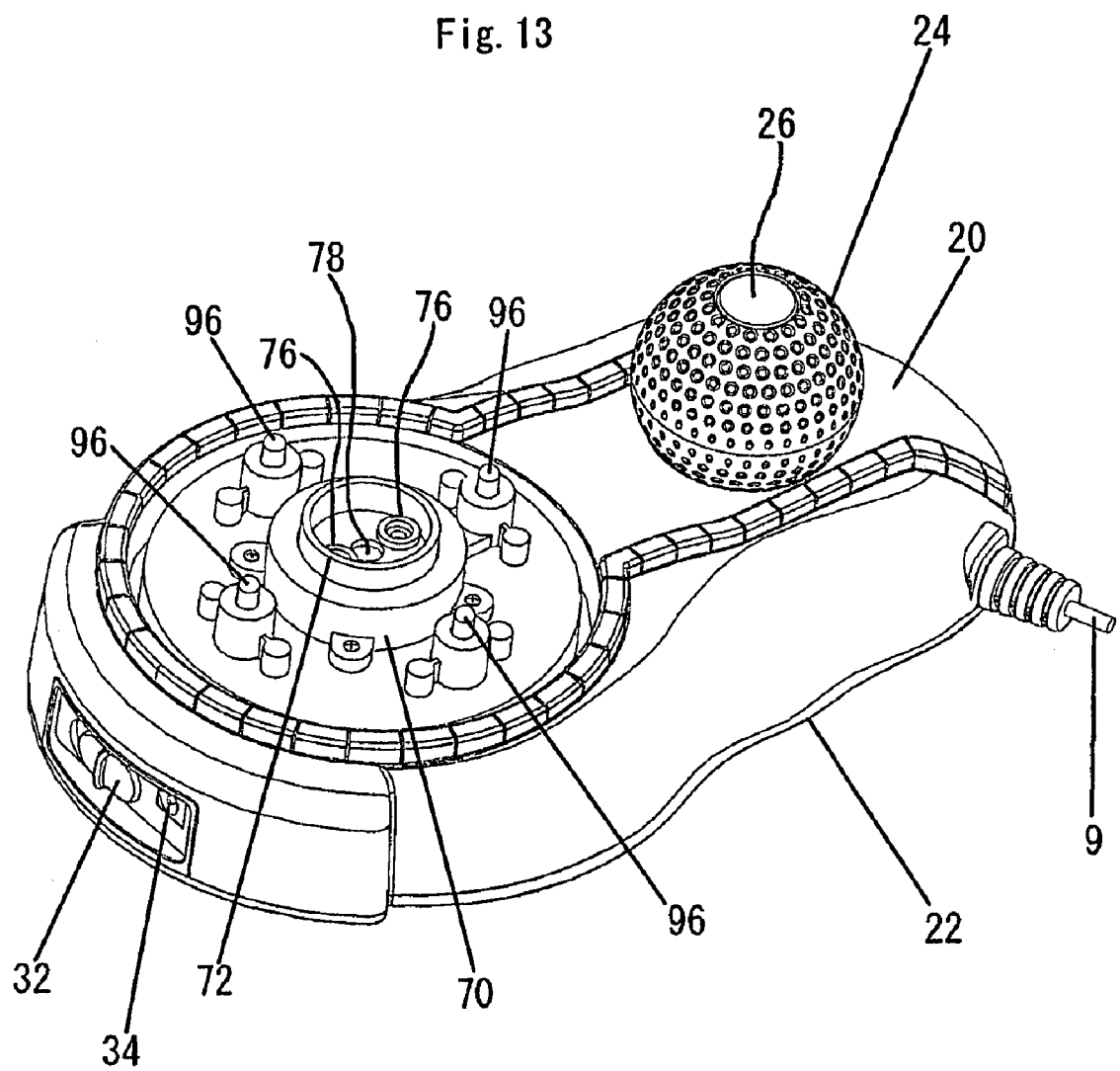
FIG. 13 is a perspective view for showing the game apparatus 1 of FIG. 2 from which the rotatable member 28 is removed.

FIG. 12 is an exploded perspective view for showing the game apparatus 1 of FIG. 2. However, FIG. 12 illustrates only components relating to the rotation detecting mechanism and the push mechanism of the rotatable member 28, but illustration of other components is omitted. FIG. 13 is a perspective view for showing the game apparatus 1 of FIG. 2 from which the rotatable member 28 is removed.

As shown in FIG. 12, the cylindrical member 70 through which the opening 83 is formed is attached to the upper housing 20 such that it covers the opening 81. The diameter of the opening 83 is smaller than the diameter of the lower half of the cylindrical member 72 (i.e., the comb member 74) but larger than the diameter of the upper half. Also, the diameter of the opening 81 is larger than the diameter of the lower half of the cylindrical member 72 (i.e., the comb member 74).

Accordingly, the cylindrical member 72 is attached to the rotatable member 28 through the openings 81 and 83. More specifically speaking, also as illustrated in FIG. 11, these components are fixed to each other by inserting two bosses 82 of the rotatable member 28 into two cylindrical members 76, which are formed on the upper surface of the cylindrical member 72, through the openings 81 and 83, and threading screws. In this case, the boss 84 of the rotatable member 28 is inserted through the opening 78 of the cylindrical member 72.

Support members 100 support urging members 96 and springs 98 respectively corresponding to them, and fixed to the inner surface of the upper housing 20. In this case, as illustrated in FIG. 13, the urging members 96 are exposed respectively from openings 80 corresponding thereto of the upper housing 20, and forces are applied to the urging members 96 in the upward direction by the elastic forces of the springs 98 fitted onto them. Since the rear surface of the rotatable member 28 comes in contact with the urging members 96, when the rotatable member 28 is pushed down against the elastic forces of the springs 98, the boss 84 of the rotatable member 28 pushes the rubber switch 88 to turn on it. And, when the force pushing down is released, the rotatable member 28 is pushed back to turn off the rubber switch 88 by the elastic forces of the springs 98.

Meanwhile, the upper housing 20, the lower housing 22 and the rotatable member 28 are made of, for example, ABS (acrylonitrile butadiene styrene). Also, the cylindrical members 70 and 72 is made, for example, of POM (polyacetal). When comparing the case where ABS members are rubbed with each other and the case where POM members are rubbed with each other, there is a smaller amount of debris when the POM members are rubbed than there is when the ABS members are rubbed. Accordingly, the amount of debris as generated is reduced, as few as possible, by making use of POM for forming the cylindrical members 70 and 72, and thereby it is possible to prevent the detection by the photo interrupter 90 from being affected by debris as little as possible.

Figure 14:
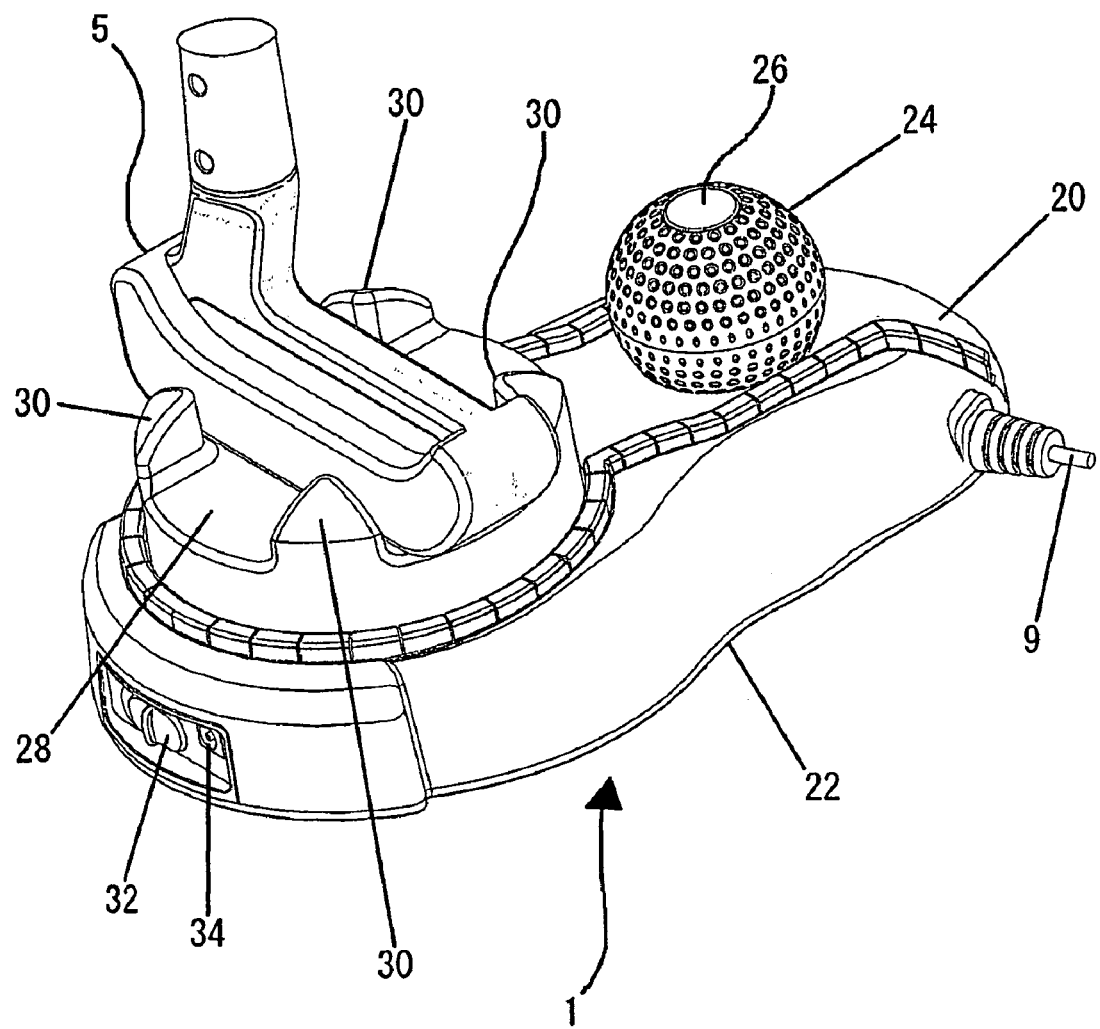
FIG. 14 is a view for showing the situation in which the rotatable member 28 of the game apparatus 1 of FIG. 2 is rotated by the head 5 of the golf club 3.

FIG. 14 is a view for showing the situation in which the rotatable member 28 of the game apparatus 1 of FIG. 2 is rotated by the head 5 of the golf club 3. As shown in FIG. 14, the player 11 can rotate the batted ball direction setting object 64 displayed on the television monitor 7 by placing the head 5 on the rotatable member 28 and rotating it. Also, the player 11 can turn on the rubber switch 88 by placing the head 5 on the rotatable member 28 and pushing down it.

Figure 15:
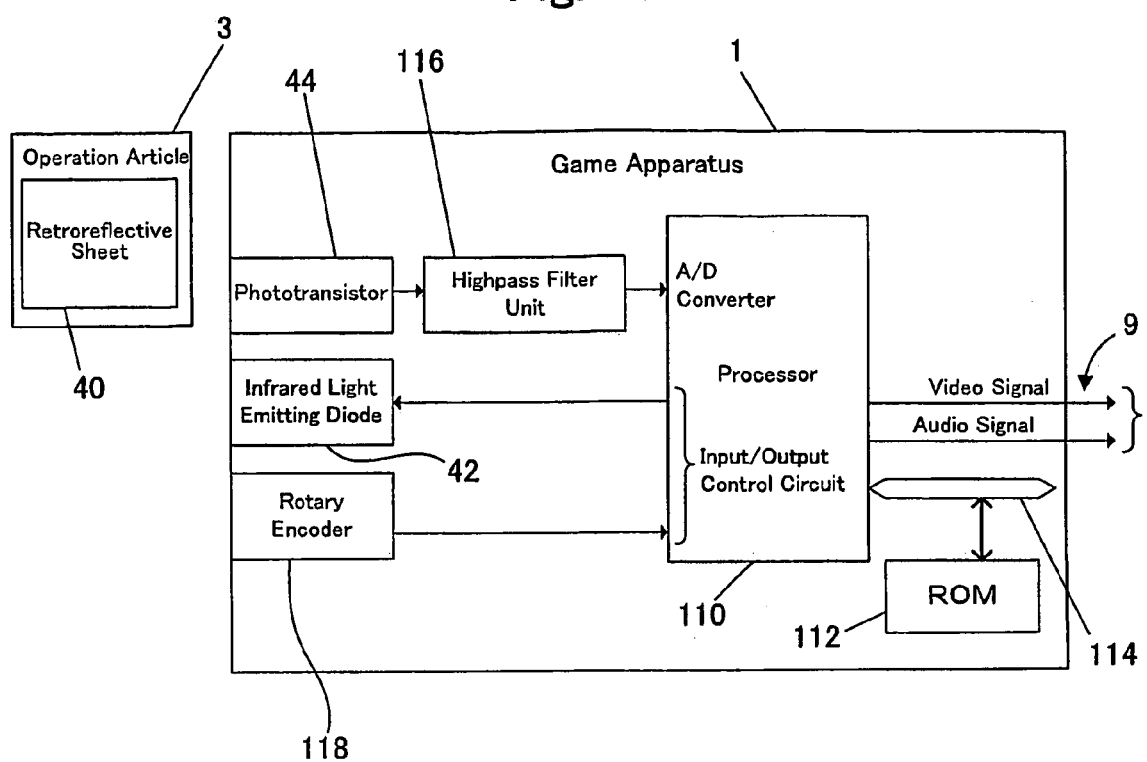
FIG. 15 is a view showing the electric configuration of the game apparatus 1 of FIG. 2.

FIG. 15 is a view showing the electric configuration of the game apparatus 1 of FIG. 2. As shown in FIG. 15, the game apparatus 1 includes a processor 110, a ROM (read only memory) 112, a bus 114, the phototransistor 44, a highpass filter unit 116, the infrared light emitting diode 42, and the rotary encoder 118.

The processor 110 intermittently drives the infrared light emitting diode 42 to intermittently irradiate the retroreflective sheet 40 of the golf club 3 with infrared light. The phototransistor 44 receives the infrared light reflected from the retroreflective sheet 40, and outputs a detection signal (light reception signal) to the processor 110 through the highpass filter unit 116. The processor 110 detects whether or not the golf club 3 is swung and the speed of the swing on the basis of the detection signal as input. Also, the processor 110 receives two pulse signals from the rotary encoder 118, and detect the amount and direction of rotation of the rotatable member 28.

Although not shown in the figure, the processor 110 includes various functional blocks such as a CPU (central processing unit), a graphics processor, a sound processor and a DMA controller, and in addition to this, includes an A/D converter for accepting analog signals and an input/output control circuit for receiving input signals from external electronic circuits and electronic elements and outputting output signals to them.

The detection signal is input to this A/D converter from the highpass filter unit 116 through an analog input port, and converted into digital data. Also, the infrared light emitting diode 42 is controlled by the CPU through this input/output control circuit. Furthermore, a counter (referred to as "built-in counter" in the following description) included in the input/output control circuit but not shown in the figure receives two pulse signals from the rotary encoder, and detects the amount and direction of rotation of the rotatable member 28. The input/output operations of the input/output control circuit are performed through input/output ports.

The CPU runs a game program stored in the ROM 112, and performs various types of arithmetic operations. The graphics processor and the sound processor read image data and sound data stored in the ROM 112 in accordance with the results of the operations performed by the CPU, generate a video signal and an audio signal, and outputs them through the AV cable 9.

Furthermore, the processor 110 is provided with an internal memory, which is for example a RAM (random access memory) but not shown in the figure. The internal memory is used to provide a working area, a counter area, a resister area, a temporary data area, a flag area and/or the like.

Figure 16:
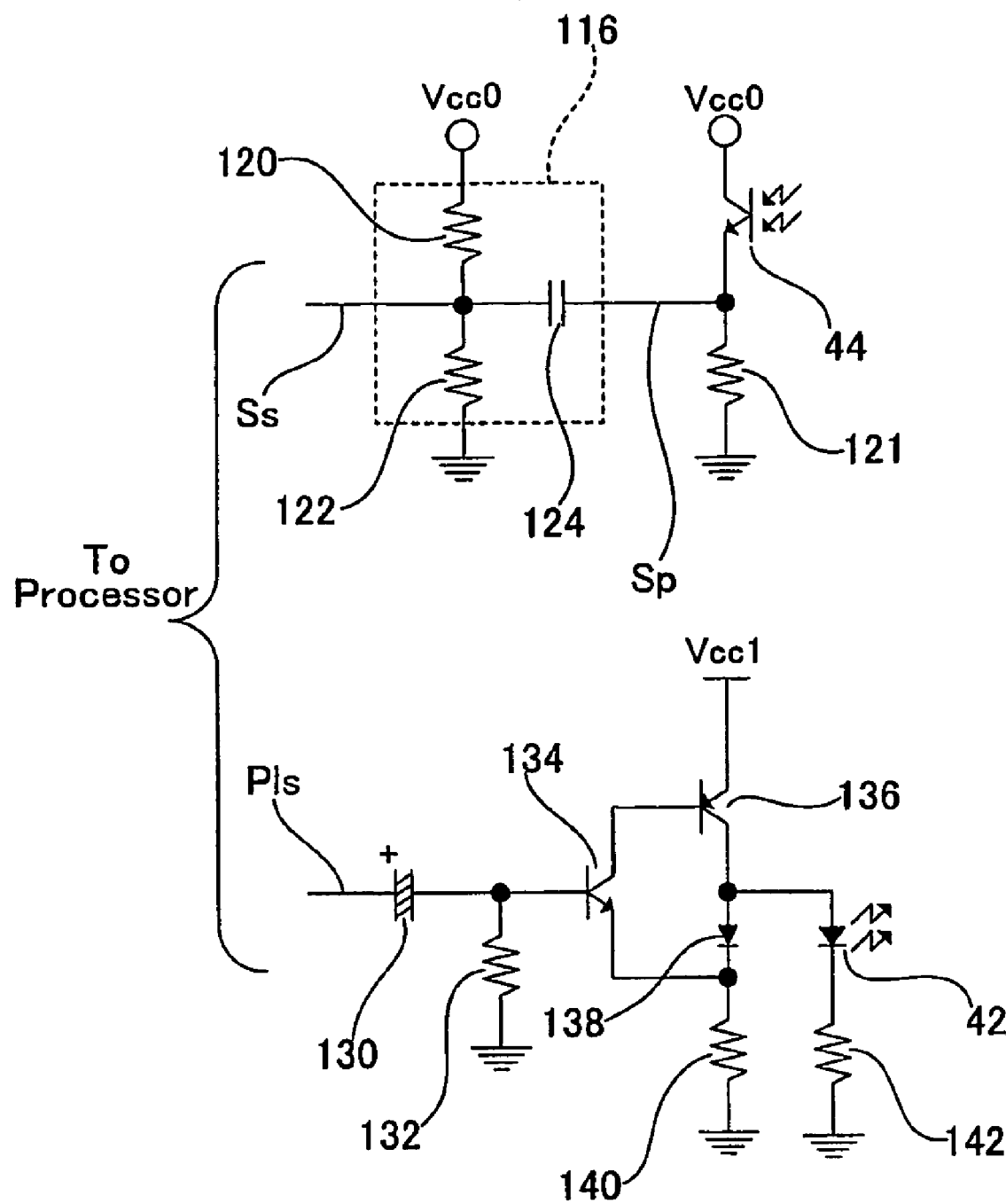
FIG. 16 shows circuit diagrams including a phototransistor 44, a highpass filter unit 116 and an infrared light emitting diode 42 of FIG. 15.

FIG. 16 shows circuit diagrams including the phototransistor 44, the highpass filter unit 116 and the infrared light emitting diode 42 of FIG. 15. As shown in FIG. 16, the phototransistor 44 and the resistor element 121 are connected in series between a power supply Vcc0 (for example, 3.3V) and ground. The connection point is connected to one terminal of a capacitor 124 while the other terminal of the capacitor 124 is connected to the connection point between resistor elements 120 and 122. The resistor elements 120 and 122 are connected in series between the power supply Vcc0 and ground. The highpass filter unit 116 is made up of the resistor element 120, the resistor element 122 and the capacitor 124, and the connection point between the resistor elements 120 and 122 is connected to the analog input port of the processor 110.

On the other hand, the infrared light emitting diode 42 and the resistor element 142 are connected in series between ground and the connection point between the collector of a transistor 136 and a diode 138. The transistor 136, the diode 138 and a resistor element 140 are connected in series between ground and a power supply Vcc1 (for example, 6V). The collector of the transistor 134 is connected to the base of the transistor 136, and the emitter of the transistor 134 is connected to the cathode of the diode 138. The base of the transistor 134 is connected to the negative electrode of an electrolytic capacitor 130 and one terminal of a resistor element 132. The positive electrode of the electrolytic capacitor 130 is connected to a particular input/output port of the processor 110.

When the processor 110 inputs a pulse signal "Pls" to the positive electrode of the electrolytic capacitor 130 through the above particular input/output port, the transistor 134 alternately repeats on/off operations. When the pulse signal "Pls" is at a low level, the transistors 134 and 136 are turned off to put off the infrared light emitting diode 42. On the other hand, when the pulse signal "Pls" is at a high level, the transistors 134 and 136 are turned on to put on the infrared light emitting diode 42. Accordingly, the processor 110 can adjust the cycle of turning on/off the infrared light emitting diode 42 by adjusting the frequency of the pulse signal "Pls". Incidentally, the electrolytic capacitor 130 serves to prevent the lighting state of the infrared light emitting diode 42 from continuing even if the processor 110 is abnormally running to continuously output a high level signal.

On the other hand, the resistor element 122 and the capacitor 124 of the highpass filter unit 116 constitute a highpass filter, which transmits only the high frequency component of the detection signal (light reception signal) "Sp" output from the phototransistor 44, and outputs it to the above analog input port of the processor 110 as a detection signal (light reception signal) "Ss". Also, the resistor elements 120 and 122 of the highpass filter unit 116 constitutes a reference voltage generation circuit to constantly supply a reference voltage Vref to the connection point between the resistor elements 120 and 122.

Accordingly, when the phototransistor 44 receives no light, the level of the detection signal "Ss" is returned to the level of the reference voltage Vref, which is then input to the processor 110. On the other hand, when the phototransistor 44 intermittently receives infrared light, pulses each of which has amplitude corresponding to the level of the infrared light as received appear on the reference voltage Vref and are input to the processor 110 as the detection signal "Ss". Next is an explanation of why the highpass filter unit 116 is provided.

Figure 17:
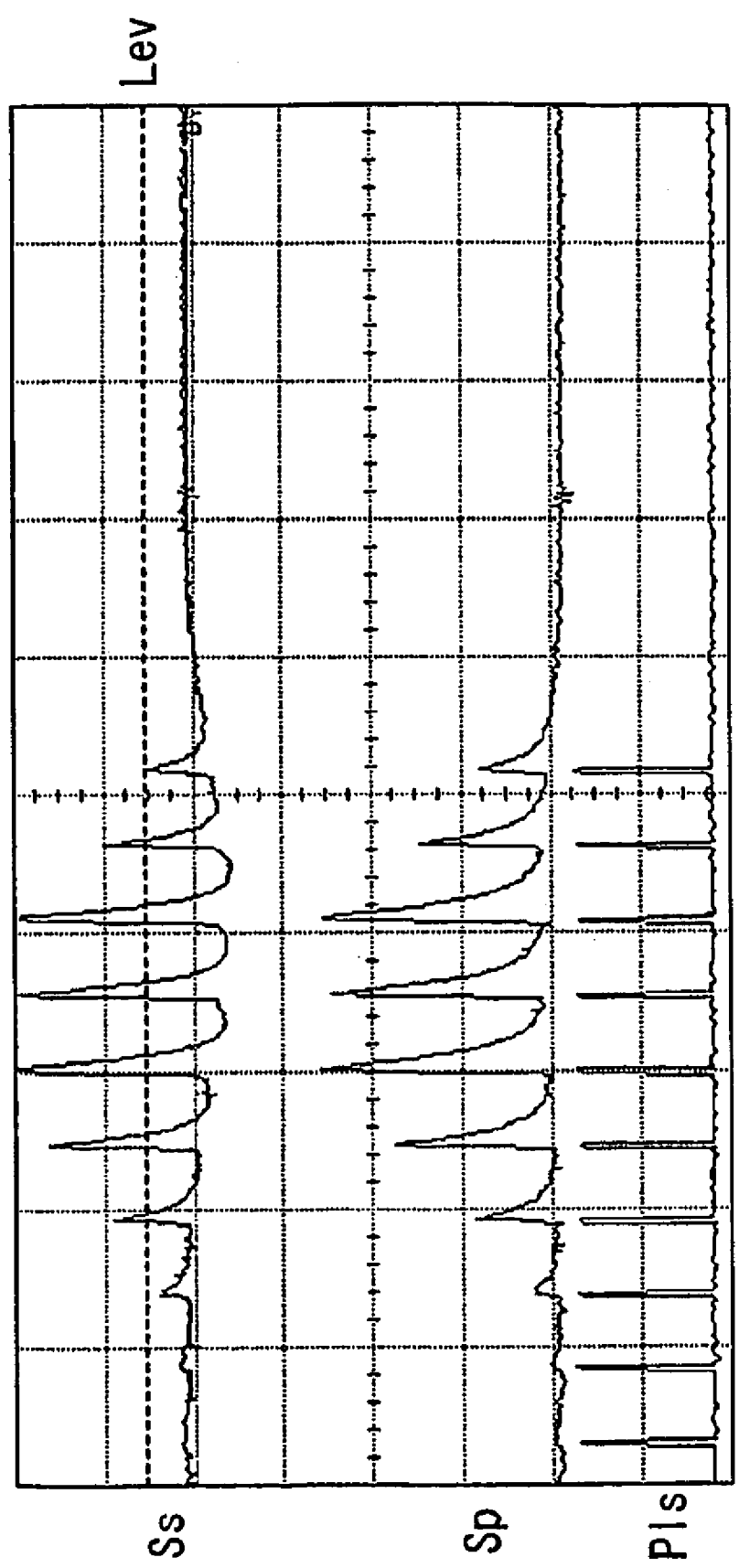
FIG. 17 is a time chart for showing detection signals "Ss" and "Sp" appearing before and after the highpass filter unit 116 of FIG. 15 when there is no incandescent light source, and a pulse signal "Pls" for turning on/off the infrared light emitting diode 42.
Figure 18:
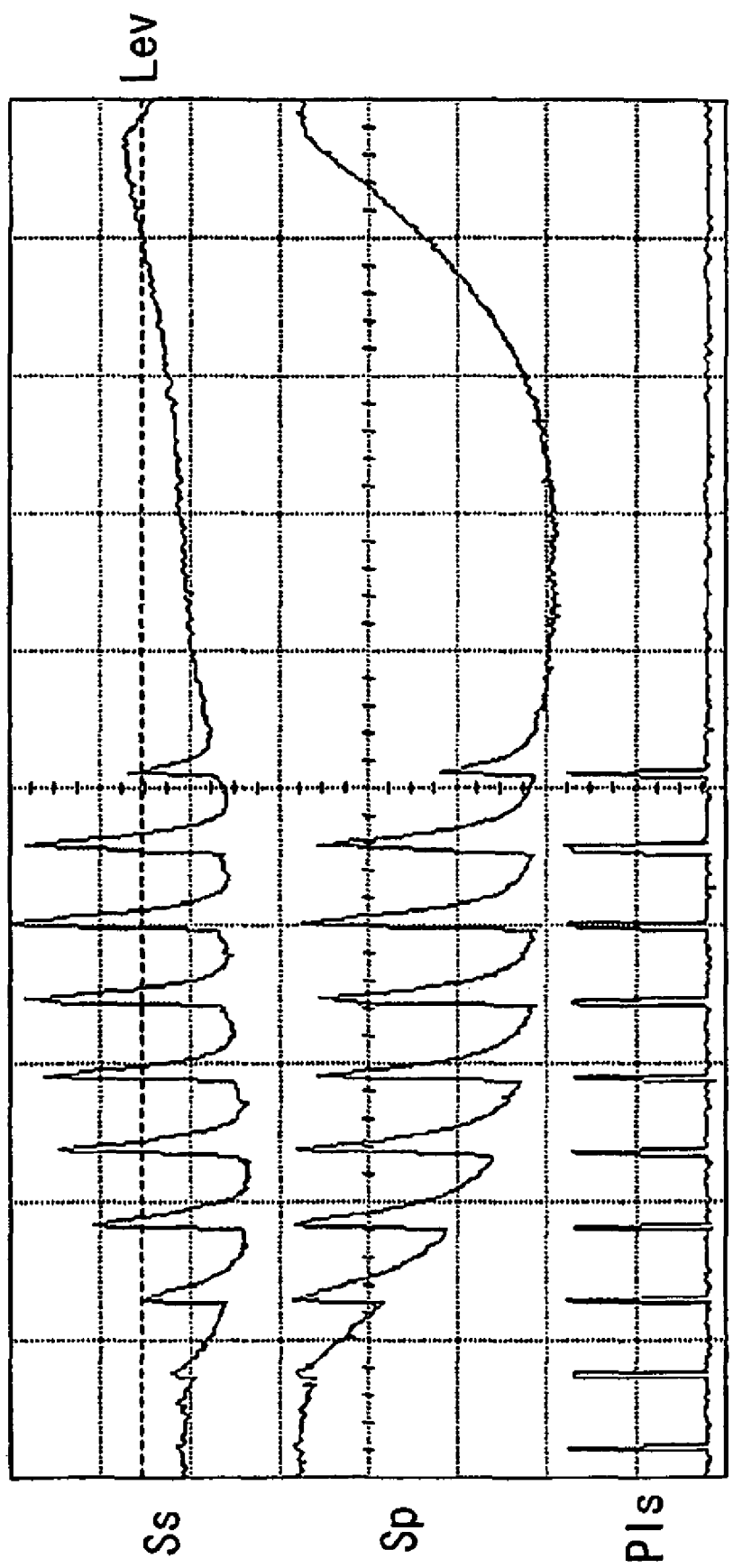
FIG. 18 is a time chart for showing the detection signals "Ss" and "Sp" appearing before and after the highpass filter unit 116 of FIG. 15 when there is an incandescent light source and a fast swing is taken, and the pulse signal "Pls" for turning on/off the infrared light emitting diode 42.
Figure 19:
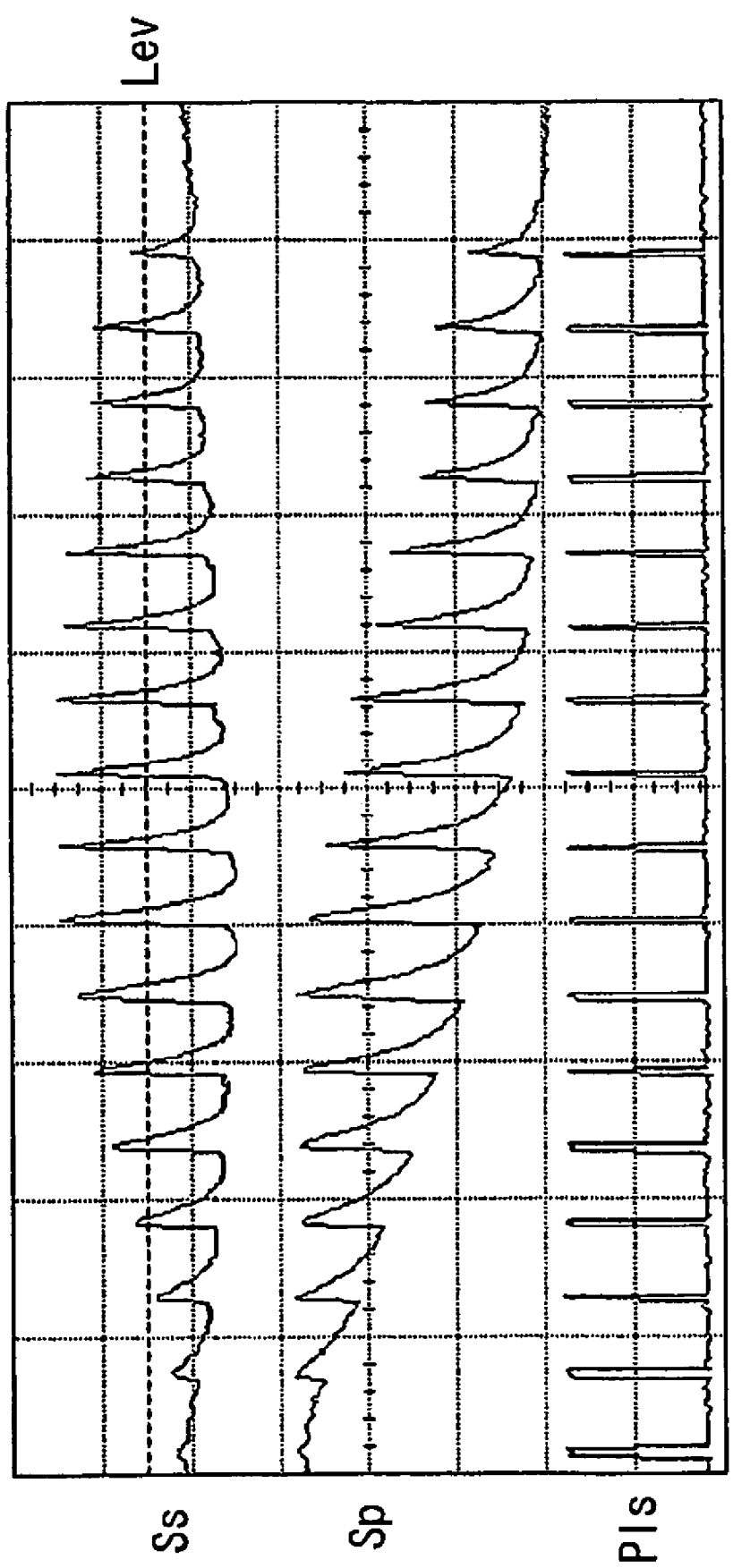
FIG. 19 is a time chart for showing the detection signals "Ss" and "Sp" appearing before and after the highpass filter unit 116 of FIG. 15 when there is an incandescent light source and a slow swing is taken, and the pulse signal. "Pls" for turning on/off the infrared light emitting diode 42.

FIG. 17 is a time chart for showing the detection signals "Ss" and "Sp" appearing before and after the highpass filter unit 116 of FIG. 15 when there is no incandescent light source, and for showing the pulse signal "Pls" for turning on/off the infrared light emitting diode 42. FIG. 18 is a time chart for showing the detection signals "Ss" and "Sp" appearing before and after the highpass filter unit 116 of FIG. 15 when there is an incandescent light source and a fast swing is taken, and for showing the pulse signal "Pls" for turning on/off the infrared light emitting diode 42. FIG. 19 is a time chart for showing the detection signals "Ss" and "Sp" appearing before and after the highpass filter unit 116 of FIG. 15 when there is an incandescent light source and a slow swing is taken, and for showing the pulse signal "Pls" for turning on/off the infrared light emitting diode 42.

As illustrated in FIG. 17 to FIG. 19, when the infrared light emitting diode 42 is turned on by the pulse signal "Pls" from the processor 110, the phototransistor 44 receives the infrared light which is reflected from the retroreflective sheet 40 of the golf club 3, and outputs the detection signals "Sp" and "Ss" including pulses. Then, the processor 110 receives the detection signal "Ss", counts the number of the pulses that exceed a predetermined level "Lev", and calculate the speed of the golf club 3 as swung on the basis of this counter value.

In this case, the predetermined level "Lev" is determined by adding a predetermined value to the average value of the reference voltage Vref generated by the highpass filter unit 116.

As illustrated in FIG. 17, in the case where there is no incandescent light source near the game apparatus 1 so that the phototransistor 44 is not influenced by such an incandescent light source, the detection signals "Ss" and "Sp" appearing before and after the highpass filter unit 116 have the substantially same waveform. Accordingly, under such an environment, it is possible to count the number of pulses also by the use of the detection signal "Sp" on the basis of a predetermined reference count value (corresponding to the predetermined level "Lev"), and thereby the highpass filter unit 116 may be dispensed with. For example, this is true when, like in Japan, a fluorescent light source is customary utilized as a light source in a room.

Contrary to this, as shown in FIG. 18 and FIG. 19, in the case where there is an incandescent light source near the game apparatus 1 (for example, like in the United States of America, an incandescent light source is customary utilized as a light source in a room), the phototransistor 44 is influenced by such an incandescent light source so that the detection signal "Sp" contains a component corresponding to light from the incandescent light source. This is because the light included in the incandescent light source has wavelengths covering a wide range, and thereby the incandescent light source emits light in a range of wavelengths which is sensible by the phototransistor 44 (for example, 700 nm to 1050 nm).

In addition to this, the influence of this incandescent light source is not stable, but can vary depending upon the intensity, number and position of the light source, and other factors of the environment of the room, and also depending upon the location and motion of the player 11.

Because of this, the counting process with reference to the above predetermined reference count value (corresponding to the predetermined level "Lev") becomes difficult, so that there is the possibility that the pulses included in the detection signal "Sp" cannot stably be counted. In other words, it is impossible to determine the predetermined reference count value for detecting whether or not the pulses appear.

With this regard, in the case of the present embodiment, the detection signal "Sp" is passed through the highpass filter unit 116, and thereby the pulses included in the detection signal "Ss" appear on the reference voltage Vref. Accordingly, the processor 110 can stably count the pulses with reference to the predetermined level "Lev".

Meanwhile, in the example shown in FIG. 17, the number of the pulses exceeding the predetermined level "Lev" is 6. Also, in the example shown in FIG. 18, the player 11 has a fast swing, and the number of the pulses exceeding the predetermined level "Lev" is 7. On the other hand, in the example shown in FIG. 19, the player 11 has a slow swing, and the number of the pulses exceeding the predetermined level "Lev" is 14.

Also, as illustrated in FIG. 17 to FIG. 19, the processor 110 stops outputting the pulse signal "Pls" after the swing of the golf club 3, i.e., when the level of the pulses included in the detection signal "Ss" is lower than or equal to the predetermined level "Lev". Then, when the next scene in which the player 11 strikes the ball object 65 arrives, the pulse signal "Pls" is output again to drive the infrared light emitting diode 42. By this configuration, it is possible to reduce the power consumption.

Figure 20:
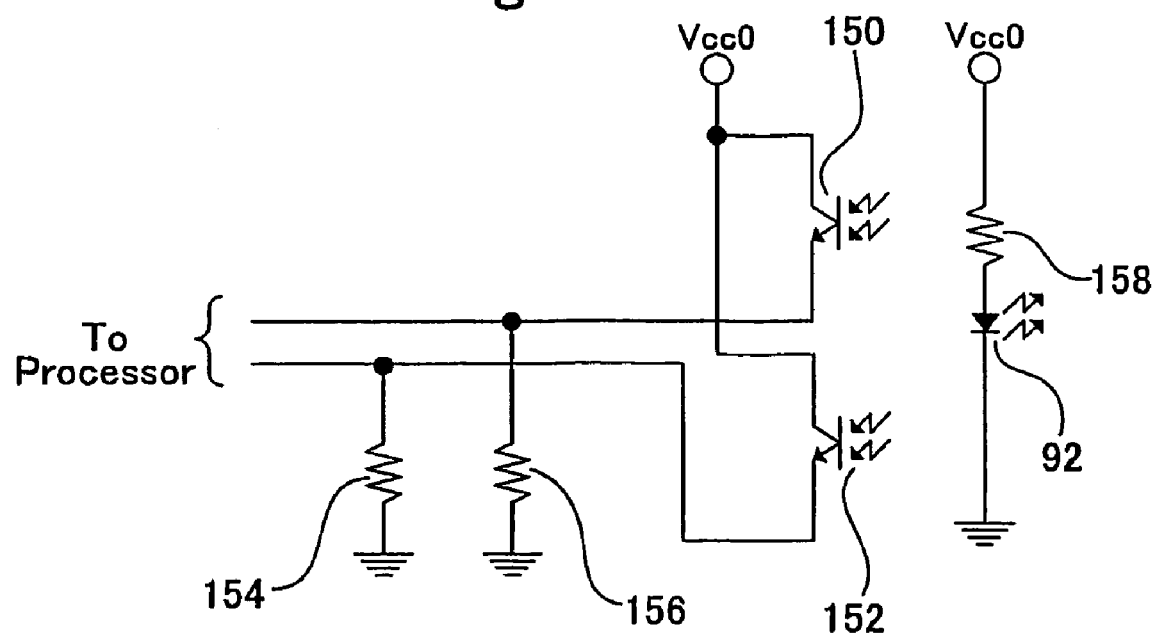
FIG. 20 is a circuit diagram for showing a rotary encoder 118 of FIG. 15.

FIG. 20 is a circuit diagram for showing the rotary encoder 118 of FIG. 15.

As shown in FIG. 20, the rotary encoder 118 includes the light emitting diode 92 and the phototransistors 150 and 152. The resistor element 158 and the light emitting diode 92 are connected in series between the power supply Vcc0 and ground. The collectors of the phototransistors 150 and 152 are connected to the power supply Vcc0, and the emitters thereof are connected respectively to particular input/output ports of the processor 110.

When the cylindrical member 72 of FIG. 12 is rotated, the light from the light emitting diode 92 is intermittently input to the phototransistors 150 and 152 by means of the comb member 74 of the cylindrical member 72. By this configuration, the pulse signals are output from the emitters of the phototransistors 150 and 152. However, since the phototransistors 150 and 152 are spaced at a predetermined interval, the phases of the two pulse signals are shifted each other in accordance with the distance between the phototransistors 150 and 152 and the distance between the adjacent light shielding sections of the comb member 74.

As has been discussed above, the processor 110 detects the amount and direction of rotation of the cylindrical member 72 on the basis of the two pulse signals.

Figure 21:
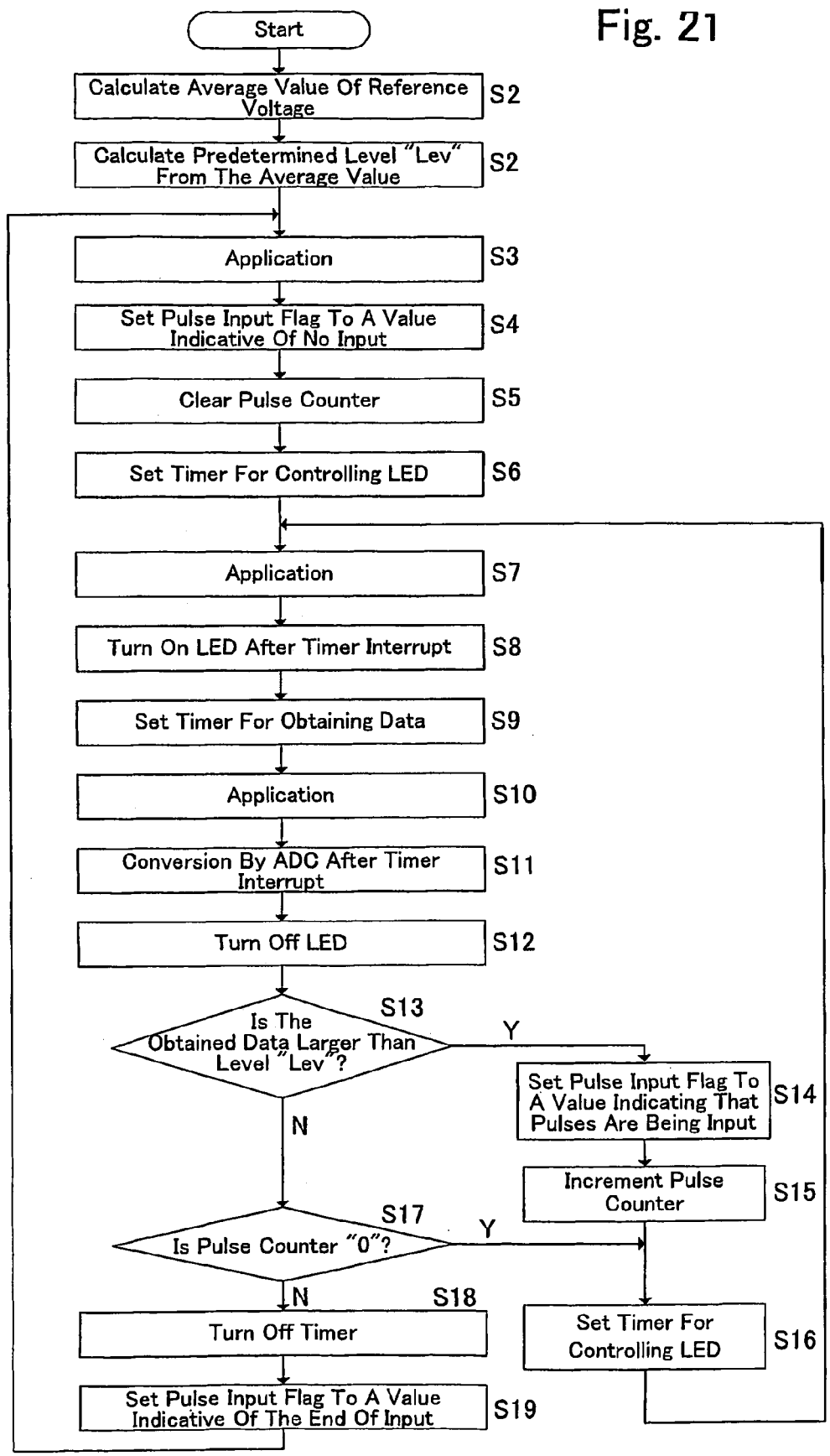
FIG. 21 is a flow chart showing an example of the process of detecting the golf club 3 by a processor 110 of FIG. 15.

FIG. 21 is a flow chart showing an example of the process of detecting the golf club 3 by the processor 110 of FIG. 15. As shown in FIG. 21, in step S1, the processor 110 calculates the average value of the level of the detection signal "Ss" (i.e., the level of the reference voltage Vref) without illumination of the infrared light emitting diode 42 by running a BIOS (basic input/output system). For example, the digital data of the detection signal "Ss" is acquired without illumination of the infrared light emitting diode 42 every time the video frame is updated, and calculates the average value of the detection signal "Ss" over eight video frames. In step S2, the processor 110 adds the predetermined value to the average value as calculated to obtain the predetermined level "Lev" (refer to step S13 to be described below).

In step S3, the processor 110 performs processes in accordance with an application program (i.e., a golf game program). When the BIOS is called during running the application program, in step S4, the processor 110 sets a pulse input flag in the internal memory to a value indicating that no pulse is input (in the initial state). This pulse input flag is a flag indicative of whether or not a pulse is included in the detection signal "Ss" which is input from the highpass filter unit 116 of FIG. 15.

In this case, the BIOS is called for processing in step S4 when it is determined that the current state is before swing in step S103 of FIG. 22 to be described below. Accordingly, the BIOS is not called for processing in step S4 in other states, and thereby the infrared light emitting diode 42 is not turned on so that the power consumption can be reduced.

In step S5, the processor 110 clears a pulse counter defined in the internal memory. The pulse counter is a counter for counting the number of pulses included in the detection signal "Ss". In step S6, the processor 110 sets a timer for controlling the infrared light emitting diode 42. This timer is incorporated in the processor 110. In the following description, this timer is called a built-in timer.

Then, when returning from the BIOS to the calling routine, in step S7, the processor 110 performs processes in accordance with the application program. And, when an interrupt is issued by the built-in timer during running the application program, the BIOS is called, and the processor 110 outputs a high level signal to the positive electrode of the electrolytic capacitor 130 of FIG. 16 in step S8 to turn on the infrared light emitting diode 42.

In step S9, the processor 110 sets the built-in timer again in order to acquire the detection signal "Ss" from the highpass filter unit 116 of FIG. 16. Then, when returning from the BIOS to the calling routine, in step S10, the processor 110 performs processes in accordance with the application program. And, when an interrupt is issued again by the built-in timer during running the application program, the BIOS is called, and the processor 110 converts the detection signal "Ss" into digital data by the above A/D converter which is incorporated in the processor 110 in step S11.

In step S12, the processor 110 outputs a low level signal to the positive electrode of the electrolytic capacitor 130 of FIG. 16 in step S12 to turn off the infrared light emitting diode 42. In step S13, the processor 110 determines whether or not the level of the detection signal "Ss" converted into the digital data exceeds the predetermined level "Lev" (refer to FIG. 17 to FIG. 19), and if it exceeds, the process proceeds to step S14 otherwise proceeds to step S17.

In step S14, the processor 110 sets the pulse input flag to a value indicating that pulses are being input. In step S15, the processor 110 increments the pulse counter by one, and sets the built-in timer again in order to control the infrared light emitting diode 42 in step S16, and the process proceeds to step S7.

On the other hand, in step S17, the processor 110 determines whether or not the current value of the pulse counter is "0", and if it is "0" the process proceeds to step S16 otherwise proceeds to step S18.

In other words, if the detection signal "Ss" is lower than or equal to the predetermined level "Lev" and the current value of the pulse counter is "0", it means that the golf club 3 is not detect yet (there is no swing), and thereby the process proceeds to step S16 for detecting a swing. On the other hand, if the detection signal "Ss" is lower than or equal to the predetermined level "Lev" and the current value of the pulse counter is larger than "0", it means that a pulse exceeding the predetermined level "Lev" is detected in the previous cycle but no longer detected in the current cycle, and thereby it means that the swing of the golf club 3 is finished.

Accordingly, in step S18, the processor 110 turns off the built-in timer. This is because the ball object 65 is moving so that it is not needed to detect the swing of the golf club 3, and thereby this process is taken for the purpose of reducing the power consumption by turning off the infrared light emitting diode 42. In step S19, the processor 110 sets the pulse input flag to a value indicating that the input of pulses is halted, and the process proceeds to step S3.

Figure 22:
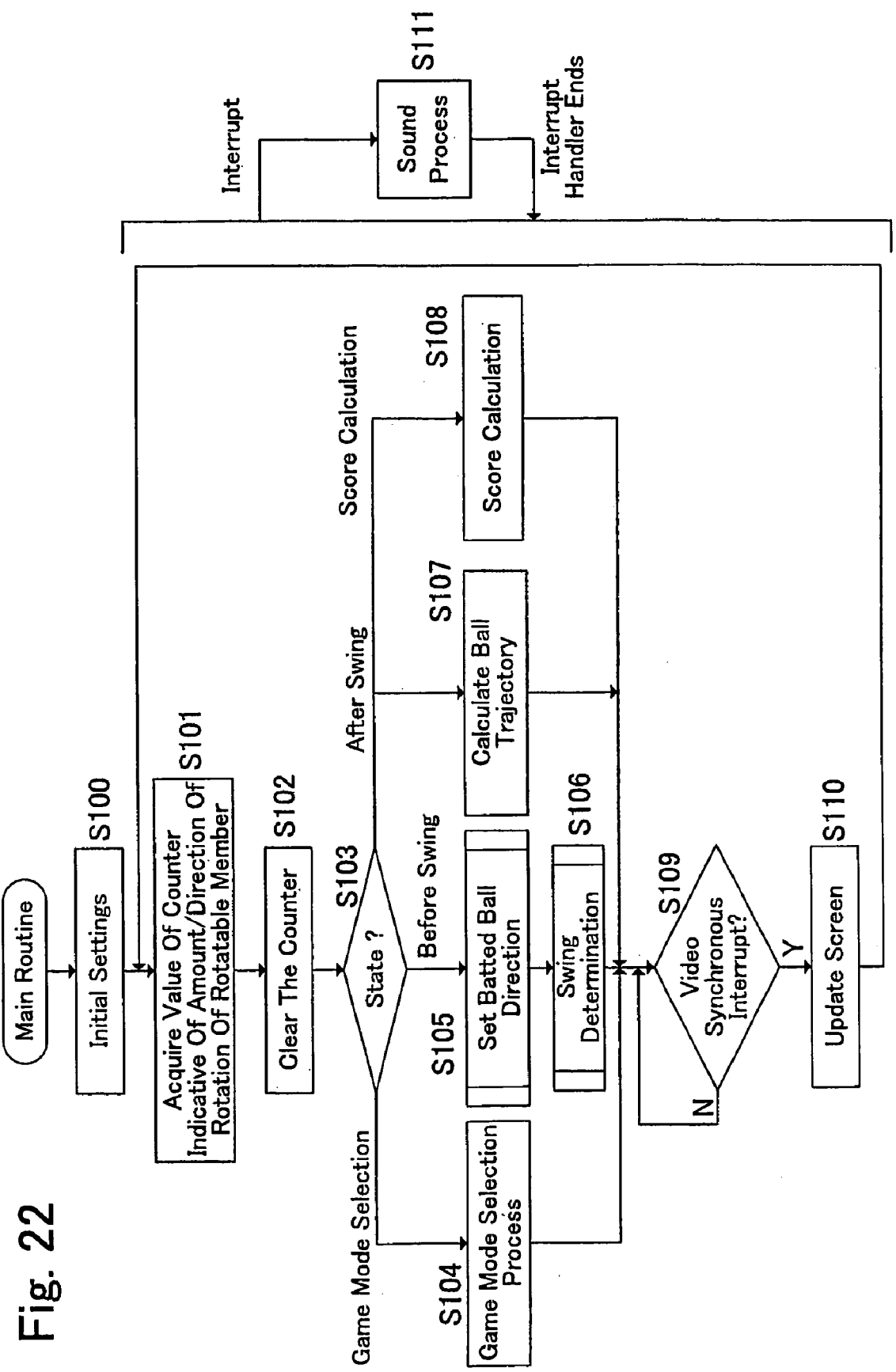
FIG. 22 is a flow chart for showing an example of the game process by the processor 110 of FIG. 15.

FIG. 22 is a flow chart for showing an example of the game process by the processor 110 of FIG. 15. As shown in FIG. 22, in step S100, the processor 110 performs the initial settings of the system. In step S101, the processor 110 acquires the value of the built-in counter. As has been discussed above, this built-in counter receives two pulse signals indicative of the amount of rotation and the direction of rotation from the rotary encoder 118, and counts the number of input pulses by counting up (for example, the rotatable member 28 is rotated in the clockwise direction) or counting down (for example, the rotatable member 28 is rotated in the counter clockwise direction) in accordance with the phase relationship between the two pulse signals. In step S102, the processor 110 clears the built-in counter.

In step S103, the processor 110 proceeds to either one of steps S104, S105, S107 and S108 in accordance with the current state. However, the first state is a state for selecting a game mode (the number of players, course and the like), and the processor 110 proceeds to step S104 in which the process for selecting a game mode is performed.

In the state before swing, the processor 110 proceeds to step S105 in which the process of setting the batted ball direction of the ball object 65 is performed, and then proceeds to step S106 in which the process of determining whether or not there is a swing of the golf club 3 is performed. In the state after swing, the processor 110 proceeds to step S107 in which the next display position of the ball object 65 is calculated on the basis of the speed of swing as detected in step S106, the batted ball direction and the virtual frictional force of the course. In the state in which a score is calculated, in step S108, the processor 110 calculates the score.

In step S109, if a video system synchronous interrupt occurs (for example, at 1/60 second intervals), the process proceeds to step S110 in which the display image is updated by generating a video signal anew, and if the system is waiting for the interrupt the process repeats the same step S109. In step S110, the processor 110 performs the process of updating the screen (video frame) displayed on the television monitor 7 in accordance with the processing result in steps S104 to S108.

The sound process in step S111 is performed when a sound interrupt is issued, the processor 110 generates an audio signal, and thereby a music sound or a sound effect is outputted.

Figure 23:
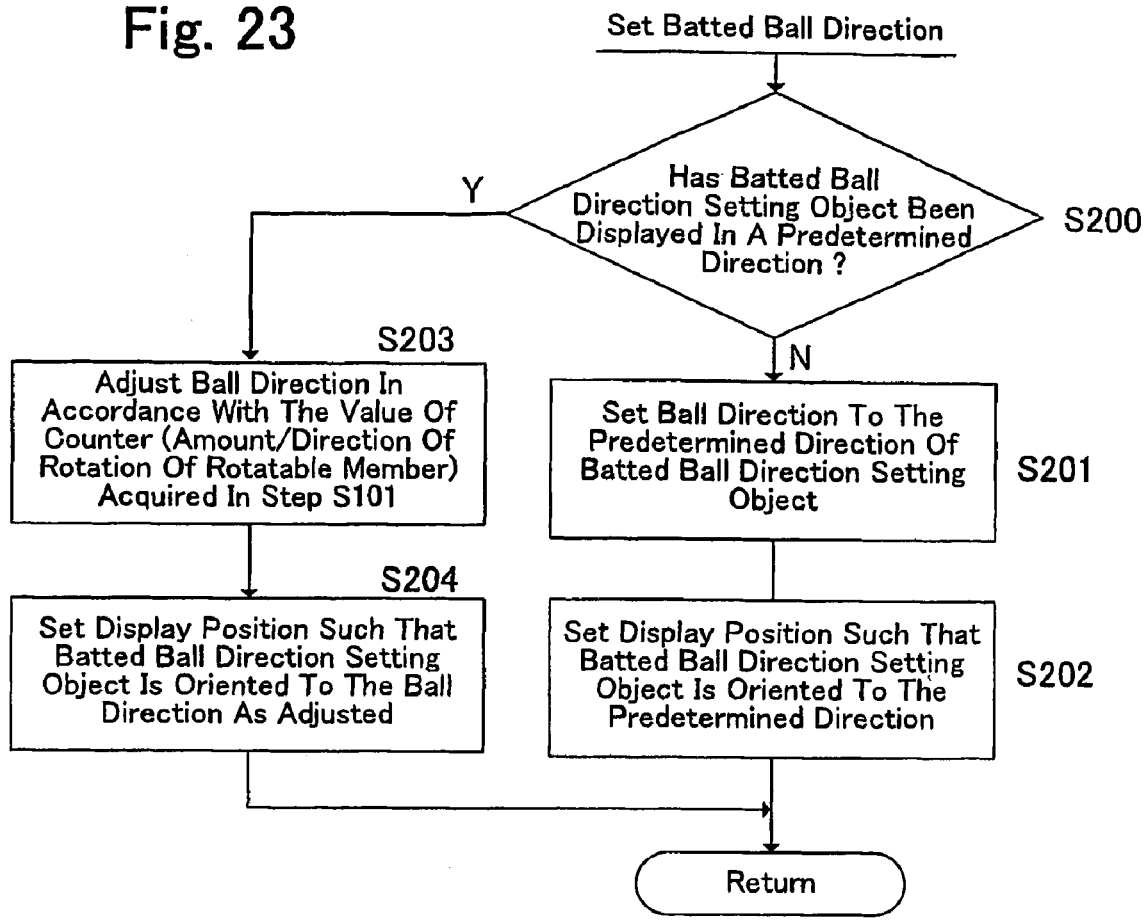
FIG. 23 is a flow chart for showing an example of the process of setting the batted ball direction in step S105 of FIG. 22.

FIG. 23 is a flow chart for showing an example of the process of setting the batted ball direction in step S105 of FIG. 22. As shown in FIG. 23, in step S200, the processor 110 determines whether or not the batted ball direction setting object 64 has been displayed such that it is oriented to a predetermined direction, and if it has been displayed the process proceeds to step S203 otherwise proceeds to step S201. In this case, the predetermined direction is the initial direction of the batted ball direction setting object 64 which is, at the starting point, the direction which is determined in accordance with the starting point, otherwise the direction which is determined in accordance with the area where the ball object 65 stops. Particularly, the predetermined direction at the starting point is sometimes called as the "standard direction". However, when simply saying the predetermined direction of the batted ball direction setting object 64, it can be the standard direction.

In step S201, the processor 110 sets the moving direction of the ball object 65 to the predetermined direction of the batted ball direction setting object 64. In step S202, the processor 110 sets the display position of the batted ball direction setting object 64 such that it is oriented to the predetermined direction.

On the other hand, in step S203, the processor 110 adjusts the moving direction as currently set of the ball object 65 in accordance with the value of the built-in counter (i.e., the amount of rotation of the rotatable member 28) acquired in step S101. In step S204, the processor 110 sets the display position of the batted ball direction setting object 64 such that it is oriented to the moving direction of the ball object 65 after the adjustment.

FIG. 24 is a flow chart for showing an example of the swing determination process in step S106 of FIG. 22. As shown in FIG. 24, in step S300, the processor 110 checks the pulse input flag. In step S301, if the pulse input flag indicates the end of input (refer to step S19), the processor 110 proceeds to step S302, otherwise the process returns to the main routine.

In step S302, the processor 110 acquires the value of the pulse counter (refer to step S15). In step S303, the processor 110 determines whether or not the counter value as acquired is larger than a predetermined threshold value (for example, "3"), and if it is larger the process proceeds to step S304 otherwise returns to the main routine. In step S304, the processor 110 calculates the initial velocity of the ball object 65 in accordance with the counter value acquired in step S302. In step S305, the processor 110 calculates and sets the next display position of the ball object 65 on the basis of the initial velocity as calculated, the virtual frictional forcee and the batted ball direction as set in step S105.

By the way, in the case of the present embodiment as has been discussed above, the number of pulses included in the detection signal (light reception signal) "Ss" varies depending upon the speed of the swing of the golf club 3 as a target of detection. Accordingly, it is possible to detect the speed of the golf club 3 only by counting the number of pulses included in the detection signal "Ss". As thus described, even if an imaging device (for example, an image sensor) is not provided, the motion of the golf club 3 can be detected by a simple structure so that the cost can be reduced.

Also, in the case of the present embodiment, the speed of the head 5 can be appropriately detected by providing the detection range setting unit 46 which is used to narrow the detection range, irrespective of the height of the head 5 passing over the infrared light emitting diode 42 and the phototransistor 44.

Furthermore, in the case of the present embodiment, while the reference voltage Vref is generated and supplied to the node (the connection point between the resistor elements 120 and 122) through which the detection signal "Ss" is output, the highpass filter unit 116 is provided for passing only the high frequency component of the detection signal "Sp" to extract the necessary signals (pulses). Therefore, the pulses appear on the reference voltage Vref. Accordingly, while avoiding the influence of an environmental light source such as an incandescent lamp as little as possible, it is possible to stably count the number of pulses. In other words, it is possible to stably detect the speed of the golf club 3 irrespective of the type of the environmental light source.

Meanwhile, the present invention is not limited to the above embodiments, and a variety of variations and modifications may be effected without departing from the spirit and scope thereof, as described in the following exemplary modifications.

(1) In the above description, while the golf club 3 is used as an example of the operation article, the shape of the operation article is not limited thereto. Also, the profile of the retroreflective sheet to be attached to the operation article is not limited to the profile of the above retroreflective sheet 40.

(2) In the above description, while the golf game is described as an example, the application program run by the processor 110 is not limited thereto.

While the present invention has been described in terms of embodiments, those skilled in the art will recognize that the invention is tot limited to the embodiments described. The present invention can be practiced with modification and alteration within the spirit and scope of the appended claims. The description is thus to be regarded as illustrative instead of limiting in any way on the present invention.

The invention claimed is:

1. A motion detection apparatus operable to detect a motion of an operation article when the operation article is held and given motion by an operator, the motion detection apparatus comprising:
   a light emitting unit operable to emit light in a predetermined cycle;
   a light receiving unit operable to receive light which is emitted by said light emitting unit and reflected from the operation article, and output a first light reception signal; and
   a counting unit operable to receive the first light reception signal and count the number of pulses included in the first light reception signal.

2. The motion detection apparatus as claimed in claim 1 further comprising:
   a light emitting range regulation unit operable to regulate the light emitting range of the light emitted by said light emitting unit; and
   a light receiving range regulation unit operable to regulate the light receiving range of said light receiving unit.

3. The motion detection apparatus as claimed in claim 1 further comprising:
   a highpass filter operable to pass a high frequency component of the first light reception signal and output the high frequency component as a second light reception signal; and
   a reference voltage generation unit operable to generate a reference voltage, wherein
   said reference voltage generation unit supplies the reference voltage to a node to which the second light reception signal is output, and wherein
   said counting unit counts the number of pulses included in the second light reception signal.

4. The motion detection apparatus as claimed in claim 2 further comprising:
   a highpass filter operable to pass a high frequency component of the first light reception signal and output the high frequency component as a second light reception signal; and
   a reference voltage generation unit operable to generate a reference voltage, wherein
   said reference voltage generation unit supplies the reference voltage to a node to which the second light reception signal is output, and wherein
   said counting unit counts the number of pulses included in the second light reception signal.

5. The motion detection apparatus as claimed in claim 3 wherein
   said reference voltage generation unit is formed by connecting a first resistor element and a second resistor element in series between a first line for supplying a first voltage and a second line for supplying a second voltage, wherein
   said highpass filter is formed of a capacitor and the second resistor element, and wherein
   the connection point between the first resistor element and the second resistor element is the node to which the second light reception signal is output.

6. The motion detection apparatus as claimed in claim 3 wherein
   said reference voltage generation unit is formed by connecting a first resistor element and a second resistor element in series between a first line for supplying a first voltage and a second line for supplying a second voltage, wherein
   said highpass filter is formed of a capacitor and the second resistor element, and wherein
   the connection point between the first resistor element and the second resistor element is the node to which the second light reception signal is output.

7. The motion detection apparatus as claimed in claim 1 wherein
   a single light emitting diode is used as said light emitting unit, and wherein
   a single phototransistor is used as said light receiving unit.

8. The motion detection apparatus as claimed in claim 2 wherein
   a single light emitting diode is used as said light emitting unit, and wherein
   a single phototransistor is used as said light receiving unit.

9. The motion detection apparatus as claimed in claim 3 wherein
   a single light emitting diode is used as said light emitting unit, and wherein
   a single phototransistor is used as said light receiving unit.

10. The motion detection apparatus as claimed in claim 4 wherein
    a single light emitting diode is used as said light emitting unit, and wherein
    a single phototransistor is used as said light receiving unit.

11. The motion detection apparatus as claimed in claim 5 wherein
    a single light emitting diode is used as said light emitting unit, and wherein
    a single phototransistor is used as said light receiving unit.

12. The motion detection apparatus as claimed in claim 6 wherein
    a single light emitting diode is used as said light emitting unit, and wherein
    a single phototransistor is used as said light receiving unit.

* * * * *